（12）United States Patent
Ober et al.

(10) Patent No.: US 6,307,936 B1
(45) Date of Patent: Oct. 23, 2001

(54) CRYPTOGRAPHIC KEY MANAGEMENT SCHEME

(75) Inventors: Timothy Ober, Atkinson, NH (US); Peter Reed, Beverly, MA (US)

(73) Assignee: SafeNet, Inc., Baltimore, MD (US)

( * ) Notice: Subject to any disclaimer, the term of this patent is extended or adjusted under 35 U.S.C. 154(b) by 0 days.

(21) Appl. No.: 09/154,133

(22) Filed: Sep. 16, 1998

Related U.S. Application Data

(60) Provisional application No. 60/059,082, filed on Sep. 16, 1997, and provisional application No. 60/059,839, filed on Sep. 16, 1997.

(51) Int. Cl.$^7$ .................................................. H04L 9/00
(52) U.S. Cl. .............................. 380/30; 380/28; 380/29; 380/46; 380/44; 380/277
(58) Field of Search ................................ 380/28, 30, 29, 380/46, 47, 277

(56) References Cited

U.S. PATENT DOCUMENTS

| | | | |
|---|---|---|---|
| 4,987,595 | | 1/1991 | Marino, Jr. et al. .................... 380/50 |
| 5,200,999 | * | 4/1993 | Matyas et al. ......................... 380/25 |
| 5,495,533 | * | 2/1996 | Linehan et al. ........................ 380/21 |
| 5,557,346 | | 9/1996 | Lipner et al. .......................... 380/21 |
| 5,623,545 | | 4/1997 | Childs et al. ............................ 380/2 |
| 5,631,960 | | 5/1997 | Likens et al. ............................ 380/2 |
| 5,721,777 | | 2/1998 | Blaze ..................................... 380/4 |
| 5,864,667 | * | 8/1999 | Barkan ............................ 395/187.01 |

* cited by examiner

Primary Examiner—Thomas R. Peeso
Assistant Examiner—Todd Jack
(74) Attorney, Agent, or Firm—Hoffmann & Baron, LLP

(57) ABSTRACT

A key management scheme for managing encryption keys in a cryptographic co-processor includes the first step of selecting a key from one of a symmetrical key type and an asymmetrical key type. Then, the key bit length is selected. The key is then generated and, lastly, the key is represented in either an external form or an internal form.

1 Claim, 4 Drawing Sheets

CRYPTOGRAPHIC KEY MANAGEMENT SCHEME

CROSS-REFERENCE TO RELATED APPLICATION

This application is based on Provisional Patent Application Serial Nos. 60/059,082 and 60/059,839, each of which was filed on Sep. 16, 1997, and relates to U.S. patent application entitled "Cryptographic Co-Processor" filed concurrently herewith, the disclosures of which are incorporated herein by reference.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates generally to a cryptographic key management scheme, and more particularly relates to a method of creating and manipulating encryption keys without risking the security of the key.

2. Description of the Prior Art

All cryptographic techniques, whether used for encryption or digital signatures depend upon cryptographic keys. Cryptographic key management systems are a crucial aspect of providing security. Typical key management systems include key generation policies, key distribution policies and key termination policies. Cryptographic key management schemes are built on commonly used lower level concepts, such as key wrapping techniques. These techniques vary with the type of cryptographic algorithmn used and are vast in numbers. However, key management systems are unique to the developer and vary substantially depending on the type of key used and level of security required.

The key management scheme allows for efficient access to all keys so that the cryptographic algorithms can run as fast as possible and be as compact as possible, with little secure tradeoffs as possible.

OBJECT AND SUMMARY OF THE INVENTION

It is an object of the present invention to provide a comprehensive powerful and secure encryption key management scheme.

It is another object of the present invention to provide the user with a set of encryption key management rules and commands for various encryption key algorithms.

It is a farther object of the present invention to provide a method of managing the use of keys in a cryptographic co-processor.

It is still another object of the present invention to provide the user with a set of encryption key management rules that prevent the user from generating risky keys.

In accordance with one form of the present invention, a method of managing the use of keys in a cryptographic co-processor includes the steps of selecting a key type from one of a symmetrical key type and an asymmetrical key type. Then, the key bit length is selected. The key is then generated and, lastly, the key is represented in either an external form or an internal form.

The key management method allows for many different key types to be selected. Also, several key lengths may be chosen. The key may be generated in various ways to meet industry standards, and the key may be represented preferably in either an inter-operable external form or internal or external forms set up by the cryptographic co-processor manufacturer.

The key management scheme allows for a wide range of key management implementations. It is only concerned with supplying primitive key management utilities. This allows the application using the encryption key management to create either a simple flat key management structure, or a highly layered and complex military grade key management system.

DETAILED DESCRIPTION OF PREFERRED EMBODIMENTS

Section I of the Detailed Description

The features of the invention described herein are particularly applicable for use in a cryptographic co-processor, such as that disclosed in the U.S. patent application entitled "Cryptographic Co-Processor" (Ser. No. 09/154,443) filed concurrently herewith, the disclosure of which is incorporated herein by reference. A number of terms used herein are defined in the aforementioned patent application, and reference should be made to such application for a more detailed explanation of such terms.

Figure 1:
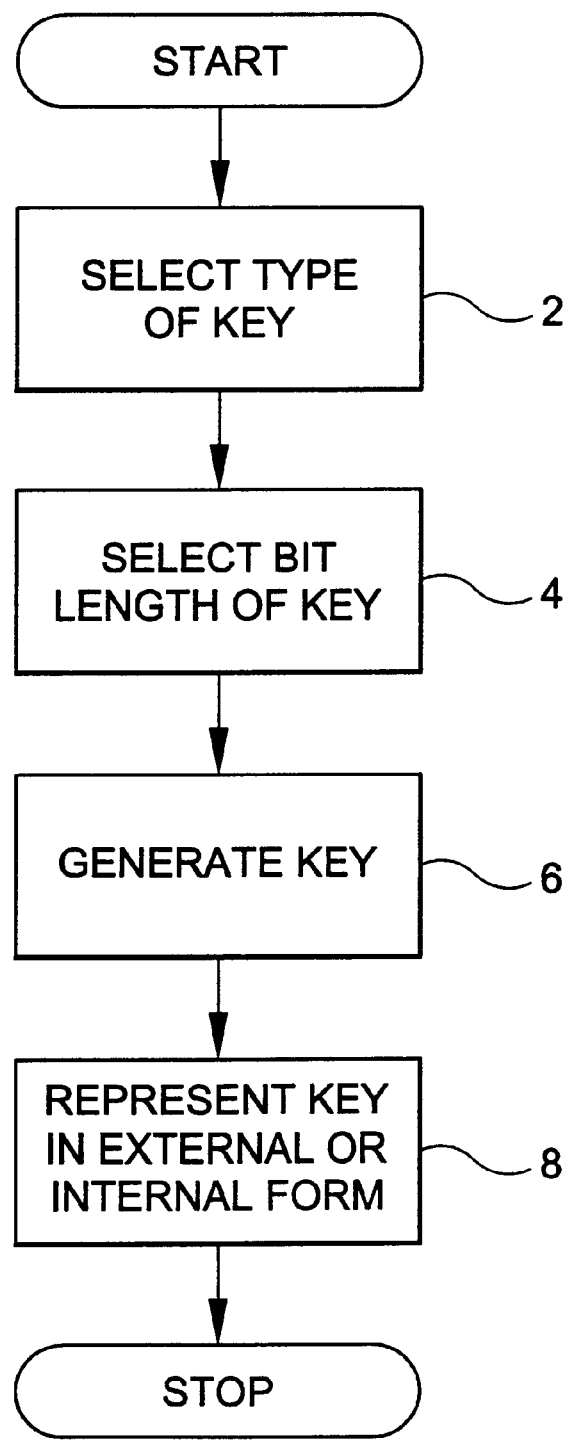
FIG. 1 is a flowchart of the method for creating and manipulating encryption keys.

Referring to FIG. 1, it will be seen that the key management method described in accordance with one form of the present invention includes the steps of: selecting a key type, selecting a key bit length, generating a key, and representing a key.

The key management method requires the user to first select between several different key types. The key management method supports algorithms and key sizes for symmetrical (secret keys) and asymmetrical (public key) cryptographic operations. The symmetrical encryption algorithms supported are DES, Triple DES (two key), and Triple DES (three key). The key sizes are 40–56 bits for DES, 40–112 bits for Triple DES (two key), and 40–192 bits for Triple DES (three key). It also supports asymmetric encryption such as Diffie-Hellman and RSA. The key size for each is preferably between about 512 and about 2048 bits. Digital signatures such as DSA and RSA are also supported and have key lengths of preferably between about 512 and about 2048 bits.

The first step (Block 2) requires the user to select either a symmetrical type of key or an asymmetric type of key. If the user selects a symmetrical type of key, there are four types of symmetrical keys for the user to choose from: data keys, key encryption keys, program keys, and message authentication code keys. The step of key access is preferably automatically selected with the choice of key type.

Data Encryption Keys (DEKs) allow a message, communications channel and files to be encrypted using one of the block algorithms (i.e. DES, Triple DES, etc.) supported by the user's system. All DEKs are stored and retrieved from volatile key cache registers. By default, a DEK is not permitted to be exported (i.e. read by the application) unless it is covered by a key encryption key. However, the DEK must be uncovered in the user's system to be used as a traffic key while it is active.

A key encryption key (KEK) allows keys to be exported for storage (as in key escrow) to allow key distribution, or for the secure exchange of traffic keys. The key management scheme preferably supports three types of KEKs: an internally generated storage variable (GKEK); a local storage variable (LSV); and a user application generated KEK (KEK).

The application KEK is a KEK that is not preserved across resets and its storage requirements must be implemented by the application; thus, KEKs may be exported. To export a KEK, the KEK must should be covered by another KEK. This is achieved by using the GKEKs or KEKs for KEKs, and the GKEK using LSV.

Selection of symmetrical key length is the second step (Block 4). The key management method supports several key lengths depending on the symmetrical block algorithm. The key length can be adjusted between the preferred range of about 40 bits and about 192 bits, depending on the PCDB programming. For a standard DES and Triple DES, keys can preferably have about a 40 bit to a about 192 bit key length, programmable in 8-bit increments by the application. This allows for variable key lengths other than the typical 40, 56, 112, and 192 bit key lengths found on the market.

The third step (Block 6) of symmetrical key generation can preferably be performed six ways: 1) sample the output of a random number generator to assemble the desired length DEK; 2) sample the output of the random number generator to assemble the desired length KEK; 3) perform Diffie-Hellman $g^{xy}$ exponential in order to arrive at a shared secret value, such as based on ANSI X9.42; 4) derive a symmetrical secret key by hashing an application supplied password or passphrase; 5) transform a key using a combination of hashing, mixing with fixed data and re-hashing, XORing, etc.; or 6) import a RED key provided by the application.

The fourth step (Block 8) involves representing the secret key in one of preferably three ways: 1) inter-operable external form; 2) IRE (the encryption chip manufacturer) external form; or 3) IRE internal form. Numbers 2 and 3 are used to enforce the security policy, and Number 1 is used to allow shared key material with any other vendor's implementations.

The symmetrical key inter-operable external representation step should be used when an application chooses to exchange the chip manufacturer's secret key with another crypto vendor. The secret key should be converted from the chip manufacturer's storage format into one that is more easily extractable so that it can inter-operate with other crypto vendors.

If the user chooses to export a secret key, the key should be put back into an external form. The external form includes all the original random key bits, salt bits, attributes, and SHA-1 message digest. The entire external form is encrypted, including the SHA-1 message digest. The salt bits and attributes are preferably prepended to the key bits to provide randomness to skew the external key once it is encrypted in CBC mode.

The user can choose to represent the symmetrical key in the chip manufacturer's internal representation. When a secret key is loaded into the user's system, it must be put into an internal form. The internal form consists of all of the original random key bits. However, if the secret key is not a standard 56 or 192 bit key (for example, a 168 bit key), then the extracted random key bits are weakened.

If the user selects an asymmetric type of key, there are preferably three types of symmetrical keys supported: 1) Diffie-Hellman public keys for generation of a negotiated key based on a previously generated modulus base; 2) RSA public keys for both encryption and digital signatures; and 3) DSA public keys for digital signatures only. The step of key access is automatically selected with the choice of key type.

As in all public key schemes, Diffie-Hellman uses a pair of keys, public and private. However, Diffie-Hellman is unique in that it does not perform encryption/decryption or signatures as do the other public key systems. It implements a means to generate a shared secret or a negotiated DEK (i.e. traffic key or session key). The modulus, public key and private keys can be exported/imported to and from the key management scheme. The DEK can be exported, but it should be covered by one of the key maintenance KEKs (LSV, GKEKs, or an application generated KEK).

RSA uses a pair of keys, public and private, to encrypt/decrypt and implement digital signatures. However, unlike Diffie-Hellnan, the modulus cannot be fixed, and a new modulus must be generated for each new public key pair. The key pair can be exported from the key maintenance scheme. The private key is returned covered by one of the key maintenance fixed KEKs or an application generated KEK.

The DSA scheme uses a pair of keys, public and private, to implement digital signatures only. Unlike RSA, the DSA fixed moduli (p and q) and generator g may be shared among a community of users. The DSA key pair can be exported from the key maintenance. The private key is returned covered by one of the key maintenance fixed KEKs or an application generated KEK.

Selection of asymmetric key lengths is the next step (Block 4). The key management method supports several public key algorithms, each of which has a different requirement. The method supports keys and moduli in the preferred range of about 512 bits to about 2048 bits in multiples of 64 bits.

The third step (Block 6), asymmetric key generation, preferably uses the Rabin-Miller algorithm. This step generates random numbers that have a high probability of being prime. Furthermore, the method will never reuse the same modulus for an RSA or DSA new public key. The user can chose from DSA key generation, RSA key generation, and Diflie-Hellman key generation.

The application program has several ways to generate the public keyset for DSA operations. It can generate the p and q of the modulus in a safe or weak manner. The safe method is based on Appendix A of the X9.30 specification. It preferably goes through a formal method of creating p and q from a 160 bit seed and 16 bit counter. In this method, the application is insured of not using a cooked modulus. In the weak method, the p and q of the modulus are generated in a simple method of finding q a prime factor of p−1. This does not provide for a seed and counter but generates p and q faster.

The RSA key generation option requires that the RSA moduli, p and q, are generated by first finding a prime number p and then another prime number q that is close in value to p.

The application has several ways to generate the public keyset for Diffie-Hellman operations. It can generate the modulus p in a safe or weak manner. The safe method finds a safe prime, one of 2q+1. In the weak method, the modulus p is generated as a random number. In this case, the modulus is weak but will be generated relatively quickly. Furthermore, the modulus p is not tested for primality.

All three of the public key generation methods described above preferably require that in either case, p and q are tested to determine if they are prime. They are tested using the Rabin-Miller primality test, and the application can specify the number of times it wants to run the test. The more times it runs, the better the probability that the number is prime. However, the more times one runs the test, the longer it takes to generate p and q. Also, as part of the primality test the prime number to be tested goes through a small divisor test of primes between 1 and 257.

The fourth step (Block 8) in the process involves representing the private key of a public key pair. The private key may be represented in one of preferably two forms: 1) inter-operable external form; and 2) IRE (the chip manufacturer) internal form.

The asymmetric key inter-operable external representation step is preferred to be used when an application chooses to exchange a chip manufacturer's private key with another crypto vendor. In this step, one must move the private key from the chip manufacturer's storage format into one that is more easily extractable so that it can inter-operate with other crypto vendors.

The user can also choose to represent the asymmetric key in the chip manufacturer's internal representation. When an application chooses to create the chip manufacturer's private key for local storage, this format is preferably used.

Section II of the Detailed Description

The key management scheme of the present invention is particularly suited for use in the cryptographic co-processor mentioned previously. This co-processor is also referred to herein by the trademark CryptIC. Also used here is the term "IRE", which stands for Information Resource Engineering, Inc., the cryptographic co-processor manufacturer and owner and assignee of the present invention and the co-processor.

The CryptIC chip provides a unique key management scheme that allows generation of several types of keys, key usage policy, and unlimited off-chip secure storage for both symmetrical and asymmetrical keys.

The user of the CryptIC chip is presented with many key generation options. For symmetrical keys the user is provided with a means to create keys using the chip's randomizer, pass-phrases from the user, results from a Diffe-Hellman key exchange, importation of foreign keys (i.e. simple blobs from other Microsoft CryptoAPI™ cryptographic service provides (CSPs)), and specially created IRE Hash Message Authentication Code (HMAC) keys. The unique point with symmetrical keys is the support for key generation lengths preferably between about 32 and about 192 bits, in increments of 8 bits.

For asymmetrical keys, the chip can create keys for DSA, Diffie-Hellman, and RSA using a prime number generator based on the Rabin-Miller and lowest prime divisor methods. Also, it supports some unique DSA prime generation by further extending the X9.30 method. It allows the user to pass in a random seed and a means to pre-set the seed counter to something other than 0. Furthermore, asymmetrical keys can have lengths preferably between about 512 and about 2048 bits, with increments of 64 bits.

Each type of key, asymmetrical and symmetrical, includes a set of programmable attributes that provide the user with a unique set of security policies. The security policies are enforced by the secure kernel embedded within the chip. The security policies allow the user to specify the type of key, the key's usage, and the key's trust level. More importantly, the key usage and key trust level are embedded as part of the secure storage of the key using a unique mix of symmetrical encryption and one-way HASH authentication. This will be described later. Therefore, these key attributes are securely stored and are tamper proof, thus providing a means for secure policy decisions.

The type of key specifies what algorithm the key can be used in. Therefore, a key of type DES can not be used as triple DES or RL5 keys. This means a stronger key could not be used in a weaker manner, thus enforcing export law.

The key usage attribute is used to specify how a key can be used. Again, the secure kernel enforces these policy decisions; therefore, the user can not affect the policy without changing the attributes. To change the attributes, it would require the user to present the KEK the key is covered under, thus authenticating it as the owner. In any event, the key usage bits allow a user to indicate the key is a LSV, GKEK, KEK, K or KKEK.

The LSV is provided as the root key for providing off-chip secure key storage. The LSV can not be exported from the chip in RED or BLACK form. It can only be used to cover GKEKS. The GKEKs are used to provide safe secure storage of user keys; it is a key encryption key and it, too, can not be exported in the RED. Conventional KEKS are key encryption keys that the user can use to make their own secure storage hierarchy if need be or to implement older key management protocols like X9.17. The K type is used to indicate a conventional traffic encryption key. Ks can only be used in encrypting data, not other keys. KEKs can only be used to cover other keys not data encryption. These powerful policies are enforced by the secure kernel embedded in the chip.

A KKEK is a key encryption key used to uncover BLACK Ks loaded through the external high-speed interface. To use the KKE the application loads the KKEK into the special hardware (HW) KEK register of the encryption block. Once the KKEK is loaded into the HW register, the applicant can load BLACK keys into the encryption block through the external high-speed interface. Thus allowing the external high-speed interface to be used for encryption without ever exposing keys in the RED.

The key trust levels are provided to specify what types of keys can be stored under a particular KEK and the rules of exporting a particular key. There are preferably only two trust levels, trusted or untrusted. A trusted KEK can store both trusted and untrusted keys and KEKs under it. However, once a key or KEK is stored under a trusted KEK, it can no longer be moved from this KEK to another KEK. In other words, no other KEK can take ownership of the key or KEK Any untrusted K or KEK can be stored under an untrusted KEK. Any untrusted K or KEK under the untrusted KEK can be moved under another trusted or untrusted KEK. This is because an untrusted key was created in some untrusted manner, so it is possible some outsider knows or can determine the key, so storage of the key is untrusted. Untrusted key trees can allow for greater flexibility because of the key movement that is allowed with it.

For example, the user can build applications like key escrow or key back up schemes very easily using an untrusted key tree, whereas keys under a trusted key tree are highly secured The trusted KEK was created internally by the secure kernel and can not be reproduced or determined by the user; in fact, it will never leave the chip in the RED form. Therefore, the trusted key tree is more rigid and constrained than the untrusted tree but at the same time provides highly secure storage. As one can see, the trust levels are a powerful concept that allows the user lots of flexibility at the risk of less secure storage or a more constrained tree with increased security storage.

Further making the CryptIC's key management scheme unique is its ability for the user to store unlimited keys off-chip in any medium the user desires. To do this the chip must prepare the key in a form to allow for secure storage of it. Not only does the key need to be put in a secure form to prevent the disclosure of RED material, but it also must protect the secure attributes used to specify the key's secure policy requirements. The secure storage form must prevent these attributes from being attacked. Once these are programmed, they must not change. To do all of this, the chip provides data confidentiality and integrity.

To support data confidentiality and integrity, a special key form or IRE key blob object has been created. The IRE key blob object provides storage for a symmetrical key and consists of the following bits in this order:

| | |
|---|---|
| SALT: | 64 bits |
| ATTRIBUTES: | 32 bits |
| KEY: | 256 bits |
| MD: | 160 bits |
| | 512 bits or 64 bytes |

The SALT bits are just 64 bits of random data used to help provide better encryption. This random data allows the keys to be covered more securely in Cypher Block Chaining (CBC) mode with a fixed initialization vector (IV).

The ATTRIBUTE bits are the type, use, and trust levels (i.e. GKEK, KEK, etc) that were described earlier.

The KEY bits are the RED key material.

The MD bits make up the one-way HASH message digest, an SHA digest.

To provide confidentiality, the chip encrypts the entire 512 bits using a TDES KEK in CBC mode. To provide integrity it runs a SHA one-way HASH over the SALT, ATTRIBUTES, and KEY bits and places the message digest (MD) at the end before it is encrypted with a KEK in TDES. Then this BLACK key is given to the user to store or transfer as it desires.

When a BLACK key is loaded into the device, the chip first decrypts the IRE key blob and then runs the SHA one-way HASH over the SALT, ATTRIBUTES, and KEY bits. If the message digest matches the one in the IRE key blob, then the key is accepted along with its ATTRIBUTES.

As discussed earlier, the device supports trusted or untrusted key storage. In the trusted key storage the IRE key blobs are stored under a GKEK root key. Therefore, the GKEKs must be exported. They are exported under the chip's unique storage variable or KEK, the LSV. The LSV is used as the KEK covering the GKEK and the GKEKs are used to cover the application's keys. Therefore, both the GKEK and LSV can not be determined so the application's keys can not be uncovered and one has trusted storage.

Furthermore, the GKEKs are provided as another layer of security in that they protect the LSV from being attacked with known plaintext or chosen plaintext. Therefore, if the LSV was broken, all keys could be found. Now, with this layering, only the key tree under the GKEK could be broken and exposed, not the other key trees.

In summary, the crytographic co-processor provides a flexible yet powerfully secure key management scheme that allows for a user controlled key policy manager and more importantly, unlimited off-chip secure store of symmetrical and asymmetrical key material, CGX command. However, if some sort of severe error or hardware failure occurred, the CGX kernel will reset the processor, thus transitioning to the reset state.

Section III of the Detailed Description

The following is a detailed description of the key management scheme of the present invention taken from a programmer's guide prepared by the assignee and owner of the invention, Information Resources Engineering, Inc. (RE). The cryptographic co-processor is often referred to herein by the trademark CryptIC.

KEY MANAGEMENT

INTRODUCTION

It is well known that a carefully designed and implemented Key Management infrastructure is a critical component of a good security system. In keeping with the philosophy of a 'security system on-a-chip', the CryptIC incorporates a powerful and secure key management system into both its hardware and CGX firmware.

There are generally 5 elements of key management to consider:

1) Key Generation
2) Key Distribution
3) Key Storage
4) Key Selection (and use)
5) Key Destruction The CRYPTIC's features support a consistent flow of Key Material through all of the five phases. In particular:

The facilities are provided by the CGX library (and the integrated hardware blocks) to generate and safely store key material.

Key 'covering' with a Key Encryption Key (KEK) is a CGX service which allows secure key distribution and secure storage.

Key selection is consistently handled through CGX library arguments and safeguards are implemented against key hijacking, spoofing, alteration, etc.

Key destruction may easily be achieved either by powering-off the CrypticIC, or by executing a Destroy_Key CGX command.

The CrypticIC allows a wide range of key management implementations, since it is only concerned with supplying the primitive key management utilities. This allows the application using the CrypticIC to create either a simple 'flat' key management structure, or a highly layered and complex 'military-grade' key management system.

The following sections describe the types of keys used on the CrypticIC, the key handling and usage conventions, and finally a discussion of key storage requirements and definitions.

KEYS

The CrypticIC supports the following algorithms and key sizes for Symmetric (secret key) and Asymmetric (public key) cryptographic operations, shown in the table below:

TABLE 1

Algorithms and Key Sizes

| | KEY SIZES | In Steps Of |
|---|---|---|
| SYMMETRIC ENCRYPTION: | | |
| DES | 40–56 bits | 8 bits |
| Triple-DES (two key) | 64–112 bits | 8 bits |
| Triple-DES (three key) | 120–168 bits | 8 bits |
| PUBLIC KEY ENCRYPTION: | | |
| Diffie-Hellman | 512–2048 bits | 64 bits |
| RSA* | 512–2048 bits | 64 bits |
| DIGITAL SIGNATURES: | | |
| DSA | 512–2048 bits | 64 bits |
| RSA* | 512–2048 bits | 64 bits |

*requires RSA licensed version of CryptIC

Since the CrypticIC implements multiple cryptographic algorithms, there is a need for several types of key. The following descriptions of the keys are grouped into Symmetric keys (also known as secret keys) and Asymmetric keys (or public key pairs).

SYMMETRIC KEYS

Symmetric keys are used in order to support the symmetric cryptographic algorithms (i.e. DES, Triple DES). The CrypticIC supports several symmetric key types for data encryption and key encryption (covering/covering). In addition to describing the three types of symmetric keys, there are several other issues discussed in this section. These include: key length, key generation, key access, and key protection.

Symmetric Key Types

There are three types of symmetric keys used on the CrypticIC:

Data Encryption Keys (DEKs)
Key Encryption Keys (KEKs)
Message Authentication Code keys (HMAC).

Each of the keys are described along with their respective properties in the following subsections.

Data Encryption Keys (DEKs)

Data encryption keys (otherwise known as sessionkeys or traffic keys) allow a message, a communications channel, a data file, etc. to be encrypted using one of the symmetric algorithms (i.e. DES, triple-DES, etc.) supported by the CrypticIC.

All DEKS are stored in and retrieved from volatile Key Cache Registers (KCRs) or written to the encrypt hardware engine's context_0 or context_1 data key register. By default, a DEK is not allowed to be exported (i.e. read by the application) unless it is covered by a key encryption key. However, the DEK must be uncovered in the CrypticIC device to be used as a traffic key.

A DEK can be generated via all the means described in the section Symmetric Key Generation, or can be imported as a Red key that was generated by an external application (assuming the applicable Program Control Data Bit allows Red key load).

Typically, DEKs are short lived (ephermeral); they are around long enough to encrypt the active secure channel. Once the secure channel is no longer required, the DEK is destroyed. The CGX Kernel that controls the cryptographic operations on the CrypticIC is not responsible for destroying DEKs since it doesn't know when a secure channel has terminated. This is left to the application via the CGX_DESTROY_KEY command. However, the CGX Kernel will destroy all volatile key cache locations upon a reset or protection violation.

Key Encryption Keys (NEKs)

A key encryption key (otherwise known as a covering key) allows keys to be off-loaded from the CrypticIC for storage (i.e. power-down recovery, key escrow, etc.), to allow key distribution, or for the secure exchange of traffic keys. The CrypticIC supports five types of KEKS:

Local Storage Variable (LSV)
internal Generator Key Encrypting Key (GKEK)
one or more application Key Encrypting Keys (KEKs)
one or more Hash/Encrypt Data Key protection KEKs (DKEKs)
optionally a Recovery KEK (RKEK)

Figure 4:
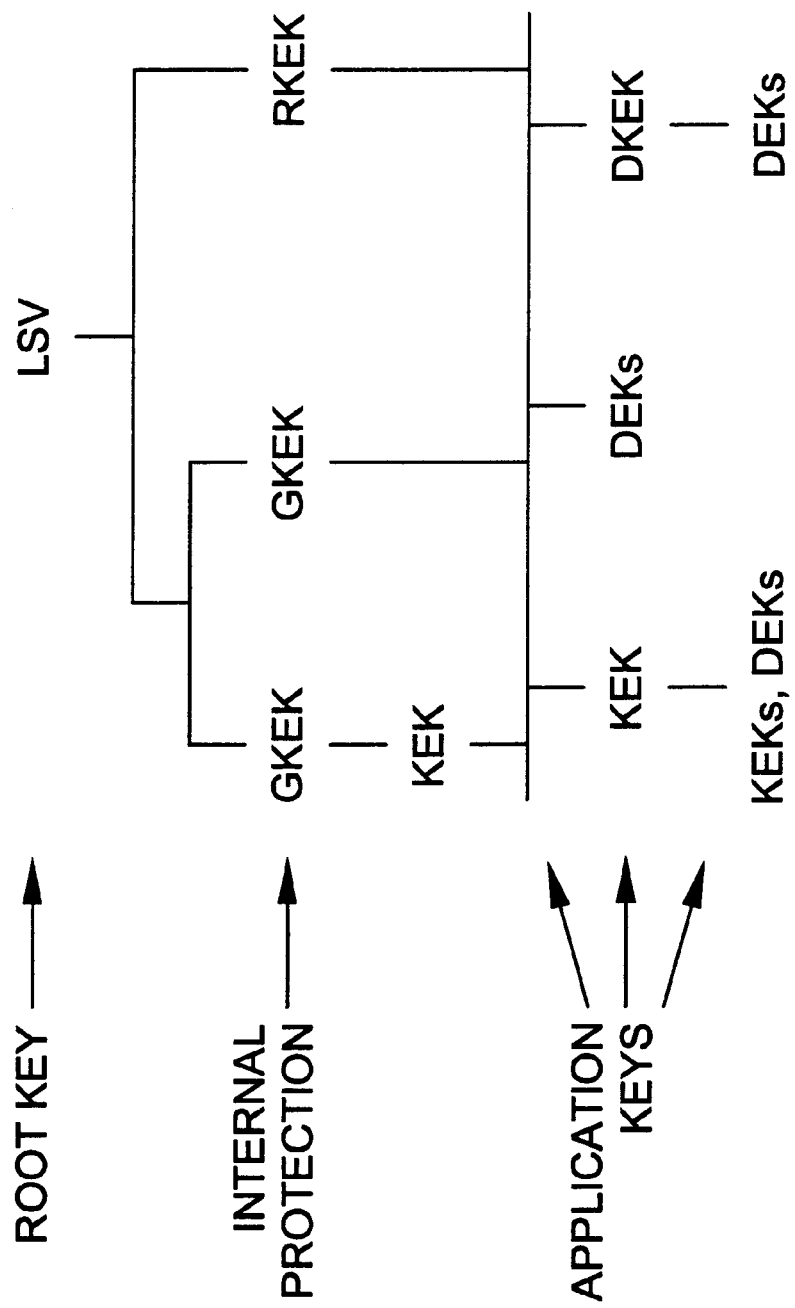
FIG. 4 is a tree diagram illustrating the symmetric key tree hierarchy preferably used in the key management scheme of the present invention.

Only the LSV is preserved across resets since it is laser-stored within the CryptIC. Therefore, the storage requirements for other KEKs must be implemented by the application. This would be achieved by off-loading the KEK covered by another KEK. (The LSV is used to cover the RKEK and GKEKs. GKEKs or other KEKs are used to cover application KEKs, DKEKs and DEKs.) The KEK hierarchy is shown in FIG. 4.

Local Storage Variable (LSV)

The LSV is a non-volatile 112-bit KEK which is laser-burned into each CrypticIC device at fabrication. It is unique to each CrypticIC produced and can be considered that chip's master 'root' key. Only GKEKs and the RKEK may be covered by the LSV.

(5–9)

Internal Generator KEK (GKEK)

The GKEK allows the application to safely build its own symmetric key hierarchy trees securely by not allowing any of the user key's Red material to be exposed. The GKEKs allow for the off-loading of internally generated user keys to be stored in the application's non-volatile store. The GKEKs effectively insulate the LSV from any direct attack, since GKEKs are always trusted and cannot be imported or exported.

Application-created KEKs

Applications can generate multiple KEKs by calling upon the CGX library to generate a KEK and then request the CryptIC to use the generated key to cover/uncover other keys. The application must off-load or export the KEK and store it for later use. This means the application must first cover the newly generated KEK with either the GKEK or another KEKso that it can leave the CryptIC. This approach offers a layered model of KEKs.

Hash/Encrypt Data key protection KEKs (DKEKs)

DKEKs are used exclusively to cover and uncover DEKs which will be used in the Hash/Encrypt hardware engine. This KEK will typically be written into the hardware context 0 or context 1 DKEK register so that it can automatically decrypt 'Black' DEKs which may be stored in a crypto context database off-chip. DKEKs cannot encrypt other KEKs.

Recovery KEK (RKEK)

A single RKEK is supported in the CryptIC. The RKEK is always a Diffie-Hellman derived key and requires an IRE-certified request to generate it. It may be off-loaded from the CryptIC covered by the LSV. The RKEK is used for covering DEKs, KEKs, or DKEKs for escrowing off-chip or for Key Recovery implementations.

HMAC Keys

An HMAC key is a special type of key which does not impose formatting constraints. An HMAC key type may be used to store the secret output of a hash result—perhaps as part of a key derivation process, or it may be used to store a secret value to be used as the input to an HMAC function. HMAC keys may be from 40 to 160-bits long in 8-bit steps.

Since it is un-formatted, key weakening is never applied to an HMAC key.

Symmetric Key Lengths

The CryptIC supports several key lengths depending on the symmetric block algorithm and the type of device (i.e. domestic version versus exportable one). The key length can be adjusted between the range of 40 bits and 168 bits, depending on the PCDB programing within the CryptIC (i.e. configured for domestic or export).

For a domestic CryptIC all DES and Triple DES keys can have a 40 bit to 168 bit key length, programmable in 8-bit increments by the application. This allows for variable key lengths other than the typical 40, 56, 112, and 168-bit key lengths. The CryptIC defines triple DES keys as three 56 bit DES keys (i.e. 168 bits in total), however a triple DES key will actually occupy 192 bits (i.e. 24 bytes) since in DES, one bit of each key byte is considered a parity bit. To allow for non-standard size keys, a symmetric key weakening algorithm is used and described below in this section.

Any key which is specified to be 40, 48 or 56-bits will automatically be considered a single-DES key. Any key which has an effective length of 64 to 112 bits will become a two-key, triple-DES key. That is, the significant bits of the key will be distributed between the first and second 56-bit sub-keys, and then the third sub-key will be a copy of the first. Any key with an effective length of 120 to 168 bits will become a three-key, triple-DES key.

This means that any key longer than 56 bits is represented in a triple DES form—ie. three 56-bit DES keys. The keys are always expanded to the full 168-bits in a manner to reflect the number of bits chosen by the application.

Symmetric Key Generation

Symmetric keys can be generated six ways on the CryptIC as described in the table below:

TABLE 2

Key Generation Techniques

| KEY GEN Technique | CGX Call | Description |
| --- | --- | --- |
| Generate DEK from RNG | CGX_GEN_KEY | Samples the output of the Random Number Generator to assemble the desired length DEK |
| Generate KEK from RNG | CGX_GEN_KEK | Samples the output of the Random Number Generator to assemble the desired length GKEK |
| Negotiate Diffie-Hellman | CGX_GEN_NEGKEY | Perform the Diffie-Hellman $G^{xy}$ exponentiation in order to arrive at a shared secret value. Based on ANSI X9.42. |
| Hash from Password/ Passphrase | CGX_DERIVE_KEY | Derive a symmetric secret key by hashing an application-supplied Password or Passphrase |

TABLE 2-continued

Key Generation Techniques

| KEY GEN Technique | CGX Call | Description |
| --- | --- | --- |
| Transform key (i.e. IPsec) | CGX_TRANSFORM_KEY | Transform a key using a combination of Hashing. Mixing with fixed data and re-Hashing, XORing, etc. |
| Import a Red key from the application | CGX_LOAD_KEY | Import a Red key provided by the application. |

Symmetric Key Representation

Symmetric keys are represented in three ways, an Internal form, an IRE External form, and an Inter-operable External form. The first two representations are used in order to enforce the security policy of the CryptIC, and the last is used in order to allow the CryptIC to share key material with other vendor's implementations.

Symmetric Key IRE Internal Representation

Symmetric keys are stored within the CryptIC in Key Cache Registers (KCRs). Note that all of the data stored is in a plaintext (Red) form so that the CGX software may access it without the overhead of decrypting anything. Untrusted software running in the 'User Mode' of the DSP does not have access to the KCRs.

The format of the storage is as follows:

[type][keylength][key-bits][weakened_keybits] [keycount][attributes]

The type field specifies the algorithm for which the key is to be used (eg. DES, 3-DES, RC-5, etc.)

The keylength field indicates the length, in bytes, of the key. For the CryptIC it will be either 8 or 24.

The keybits field is 192-bits long (three 64-bit DES keys). It contains the actual key bits which will be used by the DES or triple-DES algorithm. For single-DES, only 64-bits are used and the remaining 128-bits will be zero. The least significant bit of each byte is considered the DES parity bit and is ignored. The weakened_keybits field is 64-bits long and contains the 'original' bit values which were overwritten by O's during the key weakening process. This is necessary if the key needs to be Exported in an interoperable format. Prior to exporting, the key is 'unweakened' back to its original form. Upon importing a key, the weakening process is again performed to restore the original key. This behavior and thus the need to preserve the 'weakened bits' is needed in order to protect against key-size tampering when exporting/importing a key.

The keycount field indicates the length of the key in 64-bit blocks. For the CryptIC, it will be either 1 or 3. Although the keycount can be inferred from the keylength field, it is provided in order to optimize performance.

The attributes field is a 16-bit value with the following bit definitions, shown in the table below:

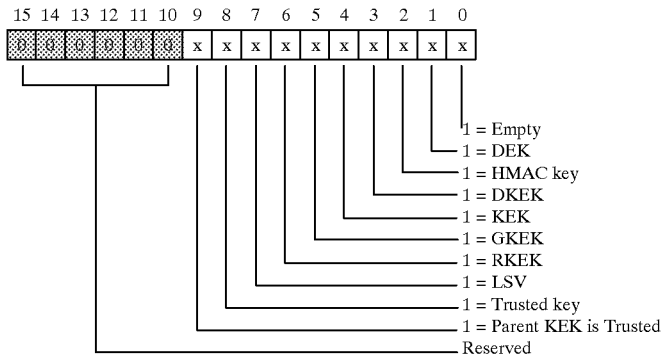

This attributes field is created when the key is first generated and stays with the key both internally and when it is off-loaded. The only exception is when a key is Exported or Imported. In these operations, the key is always considered Untrusted and the import/export operation specifies the key type.

Symmetric Key IRE External Representation

When a symmetric key is off-loaded, the key must be put into an 'IRE-external' form. The external form consists of all of the original random key bits, salt bits, attributes, and SHA-1 message digest. The entire external form is encrypted, including the SHA-1 message digest. The salt bits and attributes are pre-pended to the key bits to provide randomness to skew the external key once it is encrypted (in CBC mode).

[userfield][type][keylength] . . .
. . . $E_{KEK}${[salt][attributes][key-bits][weakened-bits][keylength]
[hash-digest]DES-pad]}
. . . [32-pad]

Where EK indicates the encryption of the data in {} by the specified KEK.

The secretkey object is 576 bits/72 bytes/18 dwords long. This contains the following:

| Field | Length | Description |
| --- | --- | --- |
| userfield | 16 | An application-specified field which may be used for any purpose |
| type | 16 | Algorithm for which the key was created (DES, triple DES) |
| keylength | 16 | Length of the key, in bytes. This field is duplicated inside the covered portion |
| salt | 54 | Random bits used to enhance the key encryption process. Similar to an IV |
| attributes | 10 | Attribute bitmap. See description above |
| key-bits | 192 | The actual DES or triple-DES key bits. If DES, then last 128 bits are zero |
| weakened-bits | 64 | The bits overwritten in the key-weakening process |
| keylength | 16 | Length of the key, in bytes. Duplicated here to be included in the Hash |
| hash digest | 160 | A SHA-1 hash of the key, attributes and salt. Provides an authentication code |
| DES-pad | 16 | Zero pad bits to round-up to the nearest 64-bit boundary (for DES encryption) |
| 32-pad | 16 | Zero-pad bits to round-up to the nearest 32-bit dword boundary |

The purpose of the DES-pad field is because DES is 8-byte block oriented and the seven blocks are formed so they can each be properly encrypted without needing padding. The 32-pad field allows the secretkey object to fall on a 32-bit dword boundary which eases handling on the PCI bus.

The SHA-1 message digest is computed over the salt, attributes, key-bits and weakened-bit fields. Once the message digest is inserted in the object, the salt through message digest fields are encrypted by a KEK The encryption mode is typically CBC, although for untrusted keys, the application may specify a different mode. A fixed IV is used for encrypting the key blob, since the random salt takes care of randomizing the encryption. This symmetric key blob is then returned to the application.

Upon loading-in the Black symmetric key blob, the CGX Kernel decrypts the key blob and runs the SHA-1 hash over the specified bits and compares the message digest to the one stored in the blob. If the message digest comparison fails, the symmetric key is rejected (i.e. not loaded).

Symmetric Key Inter-Operable External Representation

When an application chooses to exchange an IRE symmetric key with another crypto-vendor; the symmetric key must be converted from IRE's storage format into one that is more easily extractable so that it can inter-operate with other crypto-vendors. (Note that keys which are exported from or imported to the CryptIC are always considered untrusted.)

To do this, a basic storage format based on Microsoft's CtyptoAPI has been adopted. The general form of the symmetric key to be exported/imported is:

$E_{KEK}${[salt-bits][key-bits][data-bits]}

Where $E_{KEK}$ indicates the encryption of the data in {} by the specified KEK.

The application can specify no salt, it can explicitly define the salt bits, or it can request the CryptIC to generate the salt bits. The key bits consist of the Red symmetric key bits as defined in the IRE external symmetric key formation. A DES key will occupy 8 bytes and a triple-DES key (2-key or 3-key) will occupy 24 bytes. The key bits are laid out in big-endian form. The data field is supplied by the application, it can contain anything the application chooses, or it may be omitted if the application desires.

The one to three pieces of external symmetric key (salt, key bits, and data) are put into a buffer that is then encrypted by a symmetric KEK. The attributes and message digest of the IRE External form are not included in this format.

Since the external symmetric key must be covered with a symmetric KEK, the salt bits (if present) must be in multiples of 8 bytes as well. The exception to this rule is for HMAC keys. In this case the key must be in multiples of 2 bytes. Therefore, an HMCA key with a length of 5 bytes will be exported as 6 bytes with the $6^{th}$ byte exported as a 0.

In the case of covering the external symmetric key with a public key, the salt bits (if present) can be as many bytes as the application chooses and the data bits (if present) can be as many bytes as the application chooses. However, the entire size of the salt, and data bits must be less than or equal to the size of the public key's modulus used to cover them.

Symmetric Key Wakening Process

Figure 2:
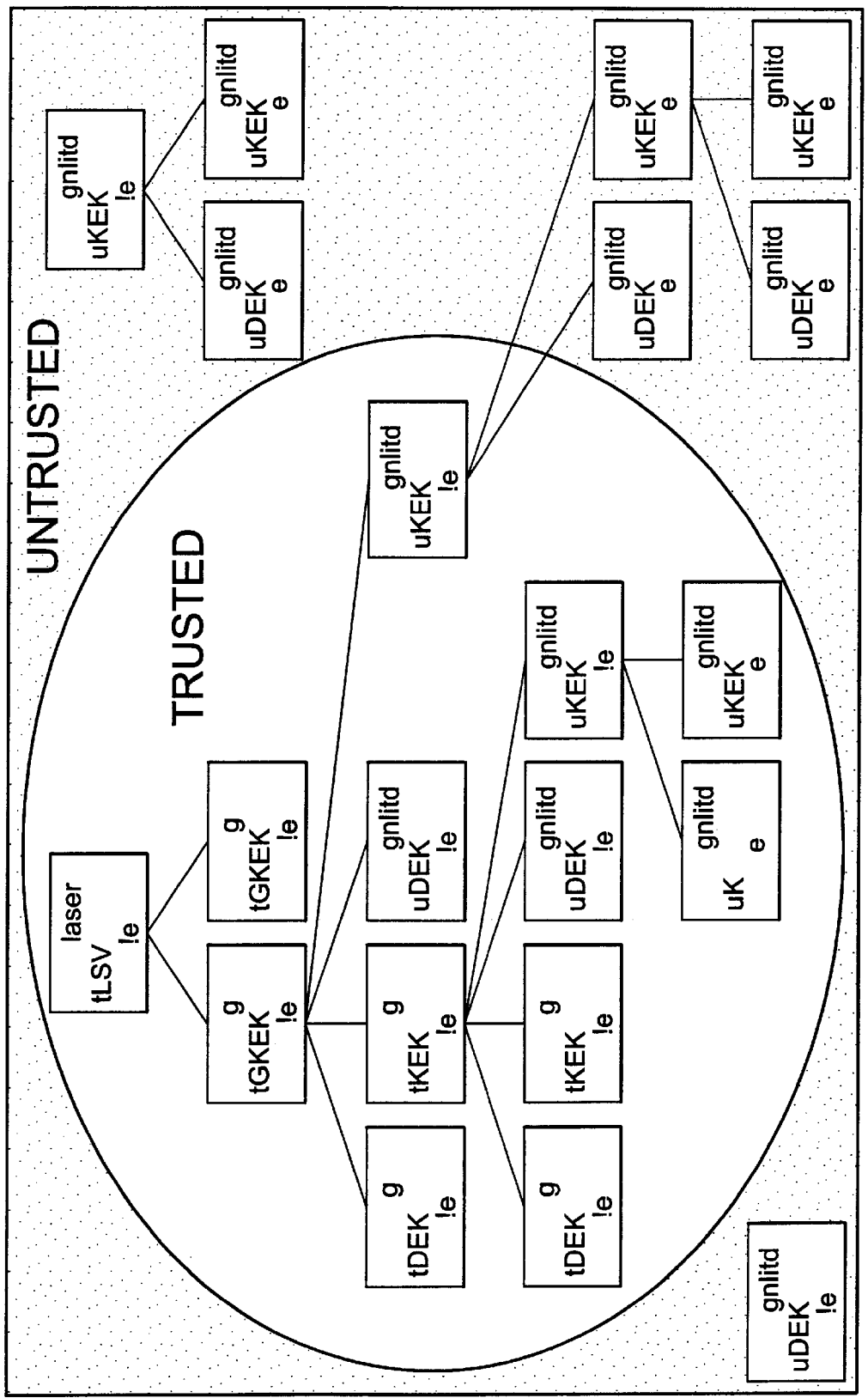
FIG. 2 is a tree diagram representing a KEK hierarchy used in a preferred form of the present invention.
Figure 3:
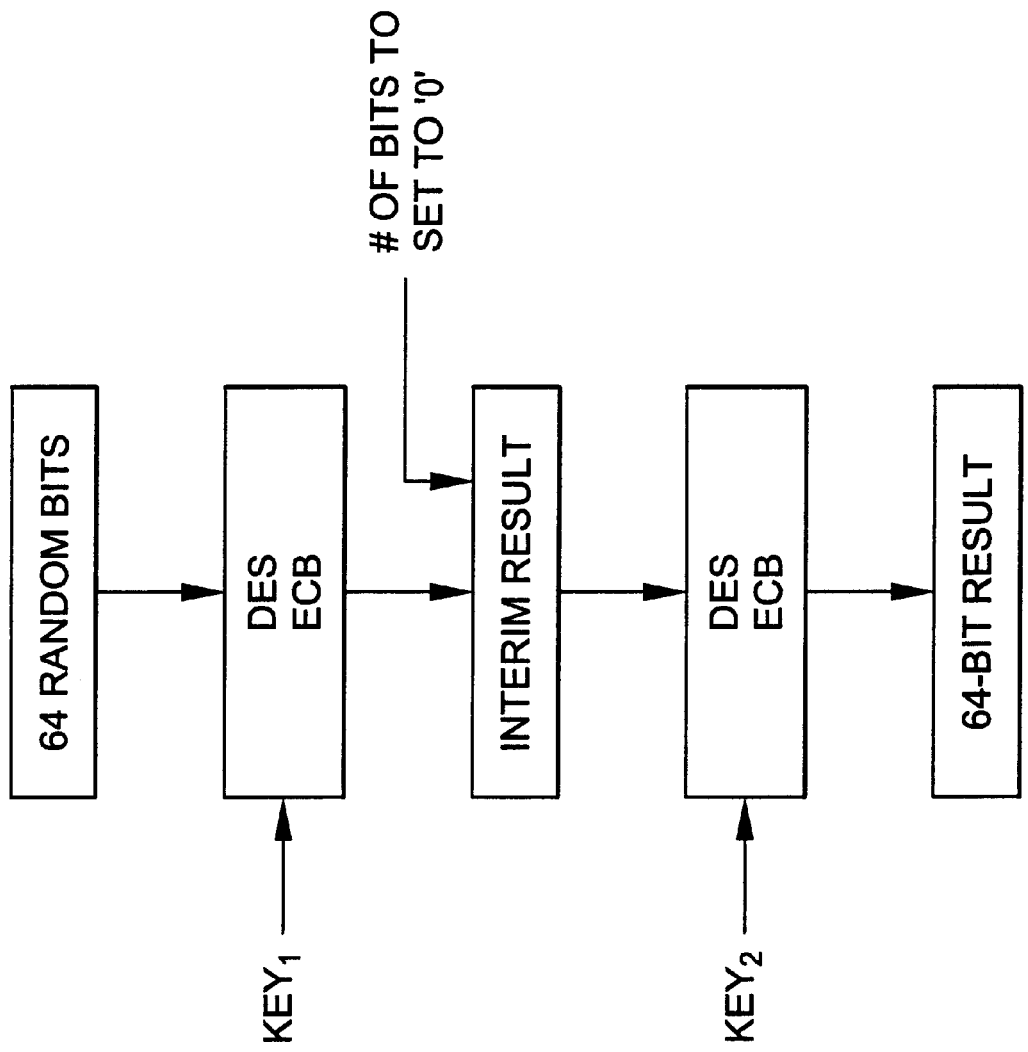
FIG. 3 is a block diagram illustrating a symmetric key weakening algorithm preferably used in the key management scheme of the present invention.

As shown in FIG. 2, the symmetric key weakening algorithm is similar to the one created by IBM called CDMF key shortening. IRE's approach is similar, with the difference in that we write 0s into the key bits starting at 0 going for the amount to be shortened by. In the CDMF approach, various bits are masked with zero.

To implement the key wakening scheme, the number of random key bits to be used is important. For 40-bits to 56-bits, 64-bits of random data are to be provided, for 64-bits to 112-bits, 128-bits of random data are to be provided, and for 120-bits to 169-bits, 192-bits of random data are to be provided. The number of random bits specified is critical in that it allows the key shortening algorithm to work correctly.

The weakening process consists of two encryptions; thus implying there are at least two fixed symmetric keys used to do this. There are 14 unique fixed symmetric keys used for this process. A set of symmetric keys for each key length between 8-bits and 56-bits is provided.; thus 7 pairs of fixed symmetric keys.

The algorithm to shortening the symmetric key is first to encrypt a fill 64-bits with the first key of the fixed symmetric key set Once the encryption is complete that output is shortened by overwriting it with zeros for the amount to be shortened by. For example, if a 40-bit key is needed, the first 24-bits of the interim result will be overwritten. Once the zeros are written onto the interim result, it is encrypted again with the second fixed key. The result of the second encryption is then used as the weakened symmetric key. This has the effect of distributing the weakened bits over the entire key.

Since we allow for key lengths to be between 40-bits and 192-bits with increments of 8-bits we also have to distribute the weakened key between the 3 key blocks (a block is defined as a 64-bit key block) if the key is to be 64-bits or greater. For 40-bits to 56-bits the key distribution does not occur, it fits in one key block.

To distribute larger keys they are first evenly distributed between the first two key blocks if they can all fit. This means that a 72-bit key is broken up so that 40-bits are in block one and the other 32-bits in block 2. This means that the bits are evenly distributed into blocks 1 and 2 and if the key length is odd (meaning the key length can not evenly distribute into the two key blocks) the extra 8 bits is put into block 1. Then when the key is laid out in the two blocks, block 1 is copied to block 3 to create a triple DES key. However, if there 128-bits or more of key, then the remaining bits are put into block 3 to complete the triple DES key.

HMAC keys are never weakened.

Symmetric Key Access and Protection

Providing access to the symmetric keys has been carefully considered in light of security and flexibility. Since the philosophy of the CryptIC is to provide a general-purpose interface, the application is given a variety of importing and exporting rules.

By Each of the symmetric key types have their own rules on key access and are addressed in more detail below in their respective sections. Furthermore, depending on the Program Control Data Bits (PCDB's), the application could be allowed to import its own Red keys to be used as KEKs and DEKs.

ASYMMETRIC KEYS

Asymmetric keys allow for the implementation of public key algorithms and digital signatures. The following sections describe the public keysets (public and private) that are used by the three asymmetric cryptographic algorithms supported by the CryptIC.

Asymmetric Key Types

Like symmetric keys, the CryptIC supports several flavors of asymmetric keys.

The three types are:
  Diffie-Hellman public keys: Used for computation of a negotiated key based on a previously generated modulus and base
  RSA public keys: Used for both encryption and digital signatures
  DSA public keys: Used for digital signatures only.

The application is responsible for storage of public keysets, eliminating the need for the CGX Kernel to store public keys. The modulus and public parts of the caseate are stored off-chip in the Red form, while the private portion of the key is covered. When requesting a public key operation, the application is required to provide as a parameter the public caseate it wishes to use. The CGX Kernel, in turn, makes a local copy of the public key and, if necessary, uncovers the private portion into the public key working kernel RAM in the CryptIC. When the operation completes, the local copy of the private key is destroyed.

Diffie-Hellman

As in all public key schemes Diffie-Hellman uses a pair of keys, public and private. However, Diffie-Hellman is unique in that it does not perform encryption/decryption or signatures as do the other public key systems. Rather, it implements a means to generate a shared secret or a negotiated DE (i.e. traffic key or session key).

Unlike RSA, a fixed modulus (n) and generator (g) can be shared among a community of users; therefore, the generation of a new stored modulus will not occur often. The modulus, public key and private keys can be exported/imported from/to the CryptIC.

A new public key (X) is generated upon request by the application; many private and public keys can be generated from one common modulus. At the same time, a private key (x) is also generated. The public key is generated using the newly generated private key (X=g$^x$ mod n).

A shared secret key or DEK can later be created by using the other CryptIC's public key (DEK=Y$^x$ mod n). The negotiated DEK can be exported from the CryptIC but in must be covered by one of the CryptIC's KEKs (GKEK, or an application-generated KEK).

RSA

As in all public key schemes RSA uses a pair of keys, public and private, to encrypt/decrypt and implement digital signatures. However, unlike Diffie-Hellman the modulus can not be fixed. A new modulus must be generated for each new public key pair. The public exponent is calculated, based on a starting point specified by the application (up to 64-bits maximum). Typically, the starting exponent is 65537, which avoids all of the known attacks on the fixed exponent of 3. Therefore, the public key is made up of the modulus (n=pq) and an exponent (e>=65537).

The private key (d) is generated by taking the multiplicative inverse of the public key (d=e$^{-1}$ mod ((p-1)(q-1)). Like the public key, an optimization is performed by using the values of p and q during the decryption and signing operations of RSA. The optimization consists of precomputing d$_p$ and d$_q$ and using the Chinese Remainder theorem (CRT). Therefore, the CGX kernel keeps p and q and the precomputations around as part of the private key.

The key pair can be exported from the CryptIC. The public key returned is made up of e and n, the private key returned is made up of d, p, q, d$_p$, d$_q$, p$^{-1}$mod q, and q$^{-1}$mod p. Storing all of these values is essential in order to optimize the RSA decryption process using the Chinese Remainder Theorem. Naturally, allowing these private components to be seen would be a security breach, therefore the private key components are returned covered via one of the CryptIC's GKEKs or an application-generated KEK.

DSA

DSA also uses a pair of keys, public and private, to implement digital signatures only. Unlike RSA, fixed moduli (p and q, and generator g) can be shared among a community of users. Therefore, the generation of a new stored modulus will not occur often. The modulus, public key and private keys can be exported/imported from/to the CryptIC.

The public key is composed of two pieces: the public key (y) and the modulus data (p,q, and g). The CryptIC will allow a modulus size to be between 512 and 2048 bits with increments of 64 bits.

The private key (x) is a random 160-bit number. For every signature, a new 160-bit k is created. Once the signature is created, k can be destroyed. Furthermore, the signature process creates r and s, they are used in the verification process to generate v which is compared to r to verify a signature. The CryptIC's command CGX_SIGN returns r and s and the command CGX_VERIFY expects r and s as arguments.

A DSA key pair can be exported from the CryptIC. The public key returned is made up of y, p, q, and g; the private key returned is made up of x. The private key is returned covered via one of the CryptIC's GKEKs or an application-generation KEK.

Program Control Data Key (PCDK)

The PCDK is a fixed DSA public key that is stored in masked ROM. The PCDK is used to verify the digital signature on a PCDB modification token (this is explained in more detail in the section Programmable Control Data Bits Initialization String (PCDB_IS) or to verify the signature on 'Extended Code' which may be loaded into the chip at run-time. The PCDK is hard-coded into the CGX kernel and cannot be off-loaded or exported.

Asymmetric Key Lengths

Since the CryptIC supports several public key algorithms, the requirements for public key pairs and their moduli differ. However, in general the CryptIC will support keys and moduli in the range of 512 bits to 2048 bits in multiples of 64 bits.

Asymmetric Key Generation

Public key generation like symmetric key generation is very important to the security of the system. Poorly generated public keys or moduli will result in inferior cryptoprotection. The main tenet behind public key generation is the generation of random numbers with a high probability of being prime. The CryptIC implements a widely accepted method of testing for primality, the Rabin-Miller algorithm. Moreover, all prime numbers generated by the chip will have the most significant bit set and will be odd.

The CryptIC will never reuse the same modulus for an RSA or DSA new public key. However, the CryptIC does allow for a common exponent to be used for the RSA exponent. The typical choice is to use the a starting point of 65537 as the RSA encrypt exponent.

DSA Key Generation

The application has several configurable ways to generate the public caseate for DSA operations. It can generate the modulus' p and q in a safe or weak manner. The safe method is based on appendix A of the X9.30 specification. It goes through a formal method of creating p and q from a 160 bit seed and 16 bit counter. In this method the application is ensured of not using a 'cooked modulus'.

In the weak method, the modulus' p and q are generated in a simple method of finding q a prime factor of p-1. This doesn't provide for a seed and counter but generates p and q faster.

In either case, p and q tested to determine if they are prime. As noted earlier, they are tested using the Rabin-Miller primality test and the application can specify the number of times it wants to run the test. The more times it is run, the higher the probability that the number is prime. However, the more times the test is run, the longer it takes to generate p and q. Also, as part of the primality test, the prime number to be tested goes through a small divisor test of the primes between 1 and 257.

The private exponent is generated using the random number generator and the public exponent is derived from the private and modulus data. Furthermore, the application can change the private and public parts as often as it chooses for a given modulus using the CGX_GEN_NEWPUBKEY command.

RSA Key Generation

The RSA moduli, p and q, are generated by first finding a prime number p and then another prime number q that is close in value to p.

In either case, p and q are tested to determine if they are prime. As noted earlier, they are tested using the Rabin-Miller primality test and the application can specify the number of times it wants to run the test. The more times it is run, the higher the probability that the number is prime. However, the more times the test is run, the longer it takes to generate p and q. Also, as part of the primality test, the prime number to be tested goes through a small divisor test of the primes between 1 and 257.

The public exponent is created by finding an e that is relatively prime to □(n), the product (p−1)(q−1). The starting point of this search is 65537. In most cases e remains 65537. In the event that □(n)=65537k, where k>=1, then the encryption exponent will be the next largest odd value which is relatively prime to □(n).

The private exponent is found by taking the multiplicative inverse of e mod (p−1) (q−1).

Diffie-Hellman Key Generation

The application has several configurable ways to generate the public caseate for Diffie-Hellman operations. It can generate the modulus p in a safe or weak manner. The safe method finds a safe prime, one of 2q+1.

In the weak method, the modulus p is generated as a random number. In this case, the modulus is weak gut will be generated very quickly. Furthermore, the modulus p is not tested for primality.

In either case, p and q are tested to determine if they are prime. As noted earlier, they are tested using the Rabin-Miller primality test and the application can specify the number of times it wants to run the test. The more times it is run, the higher the probability that the number is prime. However, the more times the test is run, the longer it takes to generate p and q. Also, as part of the primality test, the prime number to be tested goes through a small divisor test of the primes between 1 and 257.

The private exponent is generated using the random number generator and the public exponent is derived from the generator, private exponent and modulus. Furthermore, the application can change the private and public parts as often as it chooses for a given modulus using the CGX_GEN_NEWPUBKEY command.

Asymmetric Key Representation

Asymmetric key sets are represented in one of two forms, an IRE external form, or an Inter-operable External form The IRE External form is a subset of the Inter-operable External form. The external form is modeled after the Microsoft CryptoAPI specification. Note that the asymmetric key sets contain the Public key, the Modulus/Generator, and the Private key. Only the private key portion is covered by a KEK.

Asymmetric Key IRE External Representation

When an application chooses to create an IRE private key for local storage, this format is used. This is the format that is returned for the CGX_GEN_PUBKEY and CGX_GEN_NEWPUBKEY operations.

[userfield][type][keylength][datapage][pointer-to-modulus][pointer-to-pubkey]. . .

[pointer-to-privkey] and:

The modulus/generator element is: [modulus-generator-packed]

The public key element is: [public-keybits-packed]

The private key element is $E_{KEK}$ {[salt-bits][private-keybits-packed]}.

Where $E_{KEK}$ indicates the encryption of the data in {} by the specified KEK.

For the private key portion, the application can specify salt, no salt, or request the CryptIC to generate the salt bits.

Moreover the application can use the salt bits as a means to prepend a formatted packet of data in front of the private key. The key bits are the Red private key bits. For DSA it will just include, x, a 160-bit key. For Diffie-Hellman it will just include the private key, x, a key between 160 and 2048-bits. For RSA the private key bits will be p, q, d mod (p−1), d mod (q−1), and q⁻1mod p, and d (in this order). The key bits are laid out in little-endian form.

The private key bits and salt are put into a buffer that is encrypted by an untrusted symmetric KEK.

If salt is to be supplied, it must be in 16-bit units, no single bytes allowed. Furthermore, the total byte count of salt, and key bits must be a multiple of 8-bytes in order to fall on a DES block boundary.

Asymmetric Key Inter-Operable External Representation

When an application chooses to exchange an IRE private key with another crypto-vendor, the private key must be translated from IRE's storage format into one that is more easily extractable.

To do this, a basic storage format based on Microsoft's CryptoAPI has been adopted. The general form of the private key element to be exported/imported is:

The private key element is: $E_{KEK}$ {[salt-bits][key-bits][data-bits]}.

Where $E_{KEK}$ indicates the encryption of the data in {} by the specified KEK.

The application can specify salt, no salt, or request the CryptIC to generate the salt bits. Moreover the application can use the salt bits as a means to prepend a formatted packet of data in front of the private key. The key bits are the Red private key bits. For DSA it will just include, x, a 160 bit key. For Diffie-Hellman it will just include the private key, x, a key between 160 and 2048 bits. For RSA the private key bits will be p, q, d mod (p−1), d mod (q−1), and $q^{-1}$ mod p, and d (in this order). The key bits are laid out in little endian form. The data field is supplied by the application, it can contain anything the application chooses or it can be left out if the application does not require it.

The private key (salt,key bits, and data) are put into a buffer that is encrypted by an untrusted symmetric key.

If salt or data are to be supplied, they must be in 16 bit units, no single bytes allowed. Furthermore, the total byte count of salt, key bits, and data bits must be a multiple of 8 bytes in order to fall on a DES block boundary.

KEY HANDLING REQUIREMENTS

An important requirement to defining a key management scheme is setting forth requirements on how the keys are handled by the CGX Kernel and application. The CGX Kernel presents several requirements on key handling for both public and symmetric keys. This is followed by a detailed discussion of secret/public key hierarchy and control.

The following are requirements the application must abide by in order to create and manipulate keys using the CryptIC:

1) By default, Red key exchange between the application and the CGX Kernel is only allowed in the direction from the application to the CGX Kernel (i.e., loading), for all user symmetric keys (KEKs and DEKs). Absolutely no Red key exportation is allowed.

2) All keys stored in the internal KCRs are in the Red form, no internal Black key storage is allowed
3) Black keys are not allowed as part of encryption or public key operations. In other words a key must be uncovered, in its Red form, before it can be used in any of the CGX Kernel commands. This is true for the private key of a public keyset as well.
4) All key management commands supported by the CryptIC (e.g. CGX_GEN_KEY, CGX_GEN_KEK, or CGX_GEN_PUBKEY, etc.) are atomic. This means that when a key is created, derived, or negotiated, a covered (i.e. Black or encrypted) copy of the key is returned at the same time, as part of the same command. Therefore, the only way to get back a key (i.e. the Black one) is via the command that created it. This prevents an intruder application from hijacking a key.
5) All keys used or stored by the CryptIC fall under two umbrellas of protection, trusted or untrusted. Trusted keys can never be exposed in their Red form; the CryptIC stores them in a secure and protected manner. An untrusted key can be used in many flexible ways but secure protection is left to the application.
6) All keys in a trusted tree (see FIG. 2) can not move from that tree, they are permanently stored in the tree.
7) Al keys in an untrusted tree (see FIG. 2) can move to other untrusted trees and/or trusted tree, once under a trusted tree the key can not move (as stated in item 6 above).
8) There are two classes of keys, IRE external keys (symmetric and public) and interoperable keys (symmetric and public). IRE external keys contain secure attributes that describe its trust and key type. Interoperable keys contain nothing but the key material, formatted with optional salt bits in the front and optional application-supplied data bits at the end of the key material.
9) Internal IRE keys contain two attributes: Use and Trust level. The use attributes specify the key type (i.e. KEK, DEK, DKEK). The trust level is Trusted or Untrusted (as explained in item 5 above). The use attribute mandates how a key can be used and which commands will allow it.
10) As a means to combat many types of cipher-text attacks on Red key storage, all symmetric keys and private keys (of a public keyset) will include 'Salt' which are random bits prepended to the key material prior to encrypting. The random salt data helps to prevent statistical cipher-text attacks; thus better securing a covered key.
11) In order to off load and protect user keys securely (i.e. Diffie-Hellman negotiated ones, CGX_GEN_KEY ones, or imported Red user keys) a generated internal key encryption key (GKEK) must be used. This provides an internally protected conceptual boundary around the CryptIC device and the application's non-volatile storage memory. This is because the GKEK is an extension of the CryptIC, it is never exposed and the keys covered under it are therefore never exposed.
12) The LSV is a laser programed at the factory and is unique for each CryptIC device.
13) The LSV is a two-key, triple-DES key (i.e. 112 bits), all GKEKs are covered under the LSV using triple DES in the CBC mode.
14) All GKEKs are internally generated using the CGX_GEN_KEK command.
15) To off-load a GKEK, it must be covered under the LSV (no other covering key is permitted).
16) All GKEKs are triple DES keys (i.e. 192 bits), all user keys are covered under the GKEK using triple DES in the CBC mode. The CGX Kernel supplies a fixed IV.
17) The LSV can not be exported in any form. Furthermore, the LSV can only be used by the CGX_GEN_KEK, CGX_GEN_RKEK or CGX_UNCOVER_KEY commands.
18) GKEKs can not be exported/imported, although they may be off-loaded in IRE External form. Furthermore, GKEKs can only be used to cover user keys, not as traffic keys. Therefore, the GKEK can only be used by the CGX_UNCOVER_KEY, CGX_GEN_KEY, CGX_DERIVE_KEY, CGX_LOAD_KEY, CGX_GEN_PUBKEY, and CGX_GEN_NEWPUBKEY commands.
19) A user key can be created internally via CGX_GEN_KEY (for symmetric keys) and CGX_GEN_PUBKEY (for public keys), imported in the Red form, derived via CGX_DERIVE_KEY, or negotiated via the Diffie-Hellman key exchange (symmetric key only).
20) User keys are also known as KEKs, DEKs (a symmetric key), or a Public keyset. All user keys must be covered by a GKEK, RKEK or KEK in order to be exported.
21) Once a user key is covered under a GKEK it can not be covered by any other key. In other words, the user key can not be propagated down or across in the symmetric key hierarchy. This rule prevents key stealing or spoofing.
22) User keys covered by a KEK can use either the DES or triple-DES algorithm. For untrusted keys, the application is responsible for providing an IV for the appropriate modes (i.e., CBC, CFB, and OFB).
23) The depth of the symmetric key hierarchy is unlimited, KEKs can be covered under KEKs 'N' deep as long as it abides by these key handling rules. This is the same for trusted KEKs as well.
24) The CGX Kernel knows if a KCR contains a key, the key type, the key length, and its attributes. Anything beyond that is the responsibility of the application.

Symmetric Key Handling

The CryptIC provides support for eight kinds of symmetric keys: LSV, hardware only, protection, generated, loaded, imported, negotiated, transformed, and derived. The master key is the unique LSV laser programmed into each CryptIC device. The LSV provides the ability for the application to safely offload key material without the possibility of exposing the key's Red contents.

Hardware only keys, DKEKs, are internally generated symmetric keys (via the CGX_GEN_KEY operation) that are used to cover symmetric keys, DEKs, only. The DKEK keys allow applications to load Black symmetric DEKs into the hash/encrypt crypto interface to be uncovered and used as traffic keys. This allows the application to use the hash/encrypt hardware interface securely since keys are never exposed in the Red form.

Protection keys, GKEKs, are internally generated symmetric keys (via the CGX_GEN_KEK operation) that can only be covered by the LSV. The protected keys allow the application to build a symmetric key tree hierarchy that to the application is protected internally within the CryptIC device. This protection is a conceptual boundary around in the CryptIC and the application's non-volatile memory storage. Protected keys are returned in the Black form.

Generated keys are user keys generated internally to the CryptIC, they never reside in the Red form outside the bounds of the CryptIC device. All generated keys are created via the CGX_GEN_KEY operation. An internal user key can be used as a KEK or DEK, but is always known as a trusted key by the CGX Kernel unless the application requests it to be untrusted.

Loaded keys are user keys loaded in the Red form. They can be used as a KEK or DEK, but is always known as a untrusted key by the CGX Kernel. The loaded key may be covered by a GKEK or another trusted or untrusted KEK. Loaded keys play an important role for applications such as ANSI X9.17 where the application must supply the master keys. The master keys are then used to cover the session keys that can be generated by the CryptIC or imported.

Imported keys are user keys imported from another vendor's crypto-system, in the Black form. They can be used as a KEK or DEK, but is always known as an untrusted key by the CGX Kernel. The imported key can be covered by a GKEK or a trusted/untrusted KEK.

Negotiated secret keys are the result of a Diffie-Hellman key exchange. Negotiated user keys can be used as KEKs or Ks, but are always known as an untrusted key by the CGX Kernel. The negotiated key can be covered by a GKEK or a trusted/untrusted KEK.

Transformed symmetric keys are the result transforming an HMAC key into a useable DES, Triple DES, or RC5 key. The transforms are all based on the current Ipsec working group papers on HMACs. Transformed user keys can be used as KEKs or DEKS, but are always known as an untrusted key by the CGX Kernel. The negotiated key can be covered by a GKEK or a trusted/untrusted KEK.

Derived keys are the result of a cryptographic operation that converts a pass-phrase into a symmetric key using a one-way HASH algorithm. Derived keys can be used as KEKs or DEK, but are always known as an untrusted key by the CGX Kernel. The derived key can be covered by a GKEK or a trusted/untrusted KEK.

FIG. 2 presents the symmetric key tree hierarchy supported by the commands of the CryptIC.

The keys shown in FIG. 2 represent their type (in upper case: LSV, GKEK, KEK, DKEK, or DEK), trust level (the lower case letter to the left of key type, t for trusted and u for untrusted), generation method (the superscript as defined below), and the key movement method (the subscript as defined below).

?e=not exportable
e=exportable
g=generated
n=negotiated (Diffie-Hellman)
l=loaded
i=imported
t=transformed
d=derived Since the CryptIC does not contain nonvolatile storage, the CGX Kernel must allow a means for the application to safely off-load symmetric keys into some external non-volatile storage for future use. This is accomplished through the classification of symmetric keys shown in FIG. 2 above. All trusted keys (the ones in the white oval) are securely protected via the LSV symmetric key hierarchy. All the other keys (in the, gray shaded area of the box) are untrusted and the storage scheme is left to the application.

The trusted tree provides a means to securely store symmetric keys. The storage is secure because the parent KEK is a trusted key and by definition a trusted key means that the key was created in a maimer that prevents it from being exposed in the Red form. Therefore, the child keys under a trusted KEK are securely protected because the parent KEK is not compromised.

A trusted key must contain attributes. The attributes are used to define the class of the key and its type. The class defines the keys as a trusted or untrusted and the type defines the key to be used as a KEK or data key (DEK) only; it can't be both. For all IRE symmetric keys, the type and class will be securely stored with the key material. Therefore when a key is reloaded into the CryptIC, the type and class is reliably restored.

At the root of the trusted tree resides the LSV. The diagram shows that the LSV is trusted (tLSV), it has been laser programmed ($LSV^{laser}$), and is not exportable ($LSV_{te}$). The LSV is the master KEK for the CryptIC; it is used as the covering KEK of protected keys, GKEKs; it can not be used by the general encryption commands.

Under the LSV resides the protection keys, the GKEKs. The sole purpose of these keys is to limit the exposure of the LSV so that the application can not determine the LSV from plain-text attacks. The GKEKs are trusted keys (tGKEK), are internally generated so that the Red key material is not easily detectable ($GKEK_g$), and are not exportable ($GKEK_{te}$).

Under the GKEKs, the application is free to build its own trusted tree or make it a flat one which resides directly under the GKEK and no deeper. To build a deeper secure trusted tree, the application must create trusted KEKs. The trusted KEKs (tKEK) shown in FIG. 2 are formed via the CGX_GEN_KEK command ($KEK^g$) and can never be exported ($KEK_{te}$). A trusted KEK is similar to the GKEK in all aspects except that its parent KEK is either a GKEK or another trusted KEK; not the LSV. Therefore, the trusted tree can be as deep as one wants but the parent of each branch must be a trusted KEK. Furthermore, all child keys under a trusted KEK can not be exported, they are permanently stored under the trusted KEK.

All session keys (DEKs) stored under a trusted KEK or GKEK can be either trusted or untrusted. The trust state of these keys does not matter; it's the fact that they are stored under a trusted parent that matters. Being a trusted DEK has one slight difference then an untrusted DEK. The difference is that trusted DEKs (tDEK) shown is in FIG. 2 are formed via the CGX_GEN_KEY command ($DEK^g$). Untrusted DEKs are created in some untrusted means therefore the Red key material could be determined more easily. However, like trusted DEKs untrusted DEKs under a trusted KEK can not be exported.

Before describing the untrusted trees there is one more interesting point about trusted trees. In FIG. 2, there are two untrusted KEKs which both reside under trusted KEKs (one under a TKEK and the other under a tGKEK). They are both untrusted and therefore their children reside in the untrusted umbrella (the gray area). Although the untrusted KEKs can not be exported (because their parent KEKs are trusted) their children can because their parent is untrusted.

Untrusted trees are ones where the parent KEK of the tree is untrusted. Therefore, all keys regardless of depth under the initial untrusted parent will be marked as untrusted and will be allowed to be exported. No trusted DEK or KEK can be created under an untrusted KEK.

A good example of the untrusted tree is shown in the bottom right side of FIG. 2. The parent KEK is untrusted (i.e. KEK) and could have been created in a multitude of ways ($KEK^{gnlitd}$, generated, negotiated, loaded, imported, and derived) and is exportable ($KEK^e$). All of its children are marked as untrusted and could have been created in many ways, as with its parent. The child keys are exportable.

There is another type of an untrusted tree, called the dangling tree. All dangling trees are by definition are untrusted because the root key is always an untrusted KEK or it has no root KEK at all (i e. an untrusted DEK). The upper right hand of FIG. 2 shows an example of a dangling tree. In this example the parent is the root and is an untrusted KEK. Furthermore, the parent KEK is not exportable because there is not parent KEK to cover it.

One example of this dangling untrusted tree is the case where the untrusted parent or root KEK was created as a derived key (ie. via a pass-phrase). The application then stores keys under this derived untrusted KEK. It can now safely store away the untrusted keys and not have to store the parent KEK. Anytime it wants to use one of the stored keys it must use the CGX_DERIVE_KEK operation to regenerate the untrusted parent KEK.

Another example of a dangling tree is shown in the lower left comer of FIG. 2. In this example the dangling tree is flat, it is a single untrusted DEK. This key is untrusted and can not be exported because it has no parent to uncover it with. However, the real usefulness of this key is its use as a session key for one time only.

The DKEK keys are not shown in the diagram in FIG. 2 because they function identically to the KEKs in the diagram with one exception. The exception is that the only keys that can be covered under them are DEKs of any type (i.e. derived, loaded, etc). At no time will a KEK or another DKEK be allowed under a DKEK The DKEK key is reserved for the use of the hardware crypto-block interface. To allow applications to load in Black symmetric DEKs from an external context store (ie. in PCI or External memory space) and not have to expose their keys in the Red form.

Asymmetric Key Handling

Asymmetric keys contain three components: the public exponent, the modulus and generator, and the private exponent. The private exponent can be imported in the Red form, but only exported in the Black form (the private key must be covered). Public keys sets can be internally generated using the CGX_GEN_PUBKEY or CGX_GEN_NEWPUBKEY (generates the exponents of a Diffie-Hellman or DSA public keyset) commands.

All asymmetric keys are known as untrusted keys, therefore they can be used to cover symmetric keys to be exported or be exported themselves.

Public keys can be used as covering keys, key exchange keys, and signature keys. However, the application should create different keys for these tasks to protect they keys from various attacks. The CryptIC does not enforce key types for public keysets as it does with symmetric keys.

A computer program showing the key management scheme of the present invention is provided herewith and is incorporated herein as part of the disclosure of the invention.

Although illustrative embodiments of the present invention have been described with reference to the accompanying drawings, it is to be understood that the invention is not limited to those precise embodiments, and that various other changes and modifications may be effected by one skilled in the art without departing from the scope or spirit of the invention.

SOURCE CODE LISTING                                                              Pg. 1

```
/******************************************************************************
*
* File:          cgxovlay.c
*
* The CGX overlay operations, they implement all of the secure Kernel commands
* and are internal to the secure Kernel, not to be shared with customer.
*
* Copyright (c) 1996, 1997, 1998 by IRE Secure Solutions, Inc.
* All rights reserved.
*
*
* REVISION HISTORY:
*
* 09-Sep-96 TFO: Created File
* 20-Sep-96 TFO: Added code for CGX_GEN_KEY and CGX_GEN_KEK
* 23-Sep-96 TFO: Added call to initialize the cryptoblk object
* 23-Sep-96 TFS: Filled in hash_init and hash_data
* 08-Nov-96 TFO: Removed the MAC commands, no longer used
* 08-Nov-96 TFS: Hash commands only supported in PC environment.
* 12-Nov-96 TFO: Removed: these cmds: CGX_LOAD_PUBKEY, CGX_UNLOAD_PUBKEY,
*                CGX_WRAP_PUBKEY, CGX_DESTROY_PUBKEY, and CGX_UNWRAP_PUBKEY.
* 04-Dec-96 TFO: Removed references to ATLAS/GDS via ifdefs
* 05-Dec-96 TFO: Removed the restore member
* 05-Dec-96 TFS: Changed hash operations to be byte-oriented.
* 11-Dec-96 TFO: Added new operations: CGX_EXPORT_KEY, CGX_DERIVE_KEY, and
*                CGX_TRANSFER_KEY.  Also, modified the operations:
*                CGX_GEN_KEY, CGX_GEN_KEK, CGX_LOAD_KG, CGX_STREAM for
*                the new trusted key heirarchy scheme.
* 17-Dec-96 TFS: Made cover_key private, added import_key and provide
*                keyed hash.
* 24-Jan-97 TFO: Added GEN_PUBKEY, EXPORT_PUBKEY, SIGN and VERIFY commands
* 27-Jan-97 TFS: Merged cgxovlay_gen_pubkey and cgxovlay_gen_newpubkey into
*                   cgxovlay_pubkey.
* 16-Feb-97 TFO: Added CGX_TRANSFORM_KEY command, removed test cmd, fixed
*                random and port pubkey cmds, and create LSV hash.
* 27-Feb-97 TFS: Changed pubkey operations and hash interfaces.
* 04-Mar-97 TFO: Fixed CGX_TRANSFORM_KEY, didn't create the HMAC key
*                correctly.
* 11-Mar-97 TFO: Corrected buffer interfaces and replaced _flip with the
*                buffer_flip operation.
* 14-Mar-97 TFO: Added RC5
* 24-Mar-97 TFO: Added call to seckey_load_kek in the uncover key case
* 26-Mar-97 TFO: Changed it so secret keys remain in internal form unless
*                they are exported.
* 28-Mar-97 TFS: Added extended algorithms and changed use of digest in
*                   hash_cntxt.
* 07-Apr-97 TFO: Performed ROM optimizations, fixed export_key for RC5/HMAC
* 24-Apr-97 TFO: Changed interface to the kcr_get_seckey calls to reflect
*                new interface for extended keys.
* 28-Apr-97 TFO: Removed kcr_used from cgxovlay_get_chipinfo
* 30-Apr-97 TFS: Changes to support expanded key cache
* 03-Jun-97 TFS: Changes based on finalized paged memory scheme.
* 04-Jun-97 TFO: Moved global data to globals.c
* 22-Aug-97  JS: Changed several mem_cpy's and memset's to correct
*                lengths for target
* 29-Aug-97 TFO: added new memory unit conversion intfc
* 27-Oct-97 TFO: allow public keys to have lengths between 512 and 2048
```

```
                      SOURCE CODE LISTING                                  Pg. 2
*              bits with increments of 8 bits.  Do this for the PC
*              target only, will solve 2181 later.
* 30-Oct-97 TFO: The chipinfo command will not return info correctly to
*              application in 2181 target mode.
* 07-Nov-97 TFO: Moved extende3d program operation internals to cgxovlyl.c
*              because kernel ROM 0 bank filled up.  Also performed
*              full rewrite of it.
* 10-Nov-97 TFO: As part of cgxovlay_initialize clear out any extended
*              program space that was previously allocated.
* 06-Dec-97 TFO: Added a private operation to bump ptr and datapage
* 23-Mar-98 TFO: fixed the operation, cgxovlay_hash_crypt, to be more like
*              HW block.  This means it allows valid offset and op_offset.
*              Later the full combine driver will be provided for faster
*              pipelined operations.
* 16-Apr-98 TFO: removed cis_init and pcdb_init, its done out of kernel_init
* 17-Apr-98 TFO: moved cgxovlay_load_kg and cgx_signature to
*              cgxovlyl.c, bank ran out space
*
******************************************************************************/

/******************************************************************************
* Include files.
******************************************************************************/
#ifndef ADI2181
#include    <stdio.h>
#include    <stdlib.h>
#include    <io.h>
include    <errno.h> undef NULL
endif include    "std.h"
include    "cgx.h"
#include    "random.h"
#include    "diag.h"
#include    "kernel.h"
#include    "tv.h"
#include    "crypcntx.h"
#include    "cgxovlay.h"
#include    "pcdb.h"
#include    "secretky.h"
#include    "seckey.h"
#include    "pagedmem.h"
#include    "kcr.h"
#include    "hash.h"
#include    "bignum.h"
#include    "pubkey.h"
#include    "dsa.h"
#include    "dh.h"
#include    "rsa.h"
#include    "buffer.h"
#include        "globals.h"
#include        "dpage.h"
#include        "kcs.h"

#if !defined(ADI2181)
```

SOURCE CODE LISTING                                                    Pg. 3

```
UINT16    lsv1 = 0x2d34;
endif /* ADI2181 */ extern CGX_FUNC ExtendedEntry;

/*********** CGXOVLAY DATA DECLARATIONS **********/

/* CGX Initialization Operations */
/*
 *     This operation is used to initialize anything specific to any of the
 *     _cgx_ operations.  This operation is invoked by the secure Kernel at
 *     bootup/reset.  It is called by the operation: kernel_initialize(), see
 *     kernel.c
 */
void
cgxovlay_initialize(void)
{
        kcr_memory_init();
        random_init();
        seckey_init();
        pubkey_init();
        ExtendedEntry = (CGX_FUNC)0xFFFF;
}

/* CGX Utility Operations */
/*
 *     General operation to create a secret key and copy it into a KCR
 *     register.  This has a slightly overload interface in order to be
 *     useable by several operations.  This is only done to conserve in
 *     ROM.
 *
 *IMPORTANT NOTE IMPORTANT NOTE IMPORTANT NOTE IMPORTANT NOTE IMPORTANT NOTE
 *IMPORTANT NOTE IMPORTANT NOTE IMPORTANT NOTE IMPORTANT NOTE IMPORTANT NOTE
 *IMPORTANT NOTE IMPORTANT NOTE IMPORTANT NOTE IMPORTANT NOTE IMPORTANT NOTE
 *IMPORTANT NOTE IMPORTANT NOTE IMPORTANT NOTE IMPORTANT NOTE IMPORTANT NOTE
 *     All keys when they are created or loaded must be brought into the
 *     kernel via this operation, and this operation only.  This operation
 *     performs the necessary checks to validate the proper kernel key
 *     heirarchy.  Bypassing this operation could allow the kernel key
 *     heirarchy to be violated.
 *
 *     Furthermore, the operation _cgxovlay_cover_key must be the only
 *     operation used to cover a RED key and return it to the application,
 *     for the same reasons just explained.
 *
 *     Moreover the operation, _cgxovlay_uncover_key, must be the only
 *     operation used to uncover a BLACK secret key from the application
 *     into a RED one.
 *
 *     These rules must be enforced else the kernel key management scheme
 *     will go down the hopper.  Before making changes to the flow of keys
 *     please consult with one of these operations.
 */
UINT16
_cgxovlay_load_key(secretkey *sk, kcr r, UINT16 use, UINT16 k_type,
```

SOURCE CODE LISTING                                                   Pg. 4

```
        UINT16 length, DPAGE bk_dp, secretkey *bk, DPAGE kek_dp, crypto_cntxt
*kek_cc, BOOL rkekFlag)
{
#if !defined(TARGETPATCH)
    seckey      *kcr_seckey;        /* seckey in a KCR             */
    seckey      kcr_sk;             /* memory for seckey in a KCR  */
    secretkey   local_k;            /* Scratch secretkey           */
    crypto_cntxt cc;                /* Local copy                  */
    UINT16      kcr_type;           /* kcr's attr field            */
    UINT16      kcrtmp;             /* temp kcr attr type          */
    kcr         cckcr;              /* Crypto Context KCR id       */
    UINT16      ccattr;             /* Cc KCR's attribute field    */
    UINT16      rc;                 /* Return value                */
    UINT16      *dptr = (UINT16 *)&cc; /* Local pointer to cc      */ if (rc = kcr_check(r, KCR_VALID_T|KCR_LSV_T)) {
        return rc;
    }

/* Generate kcr_type from the use parameter (and, possibly, the
     * KEK. The result can then be validated.
     */

/* use describes the KCR type ie: KCR_GKEK*/
    if (!use) {
        return CGX_BAD_KEY_TYPE_S;
    } if (kek_cc) {
        /* Copy user-specified arguments to working copies */
        mem_cpyDS(&knlDataPage, (MEMCPY_TYPE)&dptr, &kek_dp,
(MEMCPY_TYPE)&kek_cc,
            sizeof(crypto_cntxt));

kek_cc = &cc;        /* Now, point to the local */

/* return the KCR index 1-14 */
        cckcr = crypto_cntxt_kcr(kek_cc);
        if (rc = kcr_check(cckcr, KCR_VALID_T))
            return rc;

/* get the attributes of the KCR in question */
        ccattr = kcr_get_attr(cckcr);
    }

/* All keys in the system are untrusted (by default) with the
     * following exceptions:
     *          1. GEN_RKEK - a recovery KEK is always trusted.
     *          2. GEN_KEK - a generated KEK is always trusted, and
     *          3. GEN_KEY - can be either trusted or untrusted as
     *                  long as parent is trusted. If parent is
     *                  untrusted and a trusted key is requested,
     *                  fail the request.
     */ switch (knlCommand) {
```

SOURCE CODE LISTING                                                Pg. 5

```
      case CGX_SAVE_KEY:

/* set the kcr_type */
            kcr_type = KCR_TRUSTED;

/* then the kek_cc better be an RKEK */
            if (!kek_cc)
                  return CGX_FAILED_SAVE_KEY_S;

else /* get the key type based of the attribute bits and verify
KCR_RKEK */
                  if( (kcr_get_key_type(ccattr)) != KCR_RKEK)
                        return CGX_FAILED_SAVE_KEY_S;

break;

case CGX_GEN_RKEK:           /* AN RKEK IS ALWAYS TRUSTED */
            kcr_type = KCR_TRUSTED;

/*
             * Ensure that the only type of key one can create or load
             * with the GEN_RKEK operation is a KCR_RKEK.
             */ if( (use & KCR_KTYPE_MASK) != KCR_RKEK )
               return CGX_INVALID_KEY_GEN_S;

break;

case CGX_GEN_KEK:
            kcr_type = KCR_TRUSTED;

/*
          *    Ensure that the only type of key one can create or load
          *    with the GEN_KEK operation is a KCR_GKEK.
          */
         if( (use & KCR_KTYPE_MASK) != KCR_GKEK )
               return CGX_INVALID_KEY_GEN_S;

break;

case CGX_GEN_KEY:
            /* If the application requested an untrusted key, always
             * allow this under a GEN_KEY. Otherwise, inherit the
             * trust of the parent key. By default, a generated key
             * should be trusted. But if the key is generated under an
             * untrusted key, inherit the trust of the parent.
             *
             *IMPORTANT IMPORTANT IMPORTANT:
             *    The more subtle point about this code is that if one was
             *    to use the GEN_KEY operation and you specify that it
             *    be TRUSTED, BTW that is the default mode, the following
             *    code will only assign the parent or the KEK's trust level.
             *    This means that if you were trying to place a GEN_KEY that
             *    was to be trusted under a untrusted KEK or parent the
             *    GEN_KEY or this code makes it untrusted.  Therefore, the
             *    GEN_KEY operation can be thought of a dumb operation in that
```

SOURCE CODE LISTING

```
 *     it will ignore the trusted requests and let the parent
 *     define it.  We say this in the API so user beware, we don't
 * fail but decided to implement the feature this way.  Then
 * the key tree the application is building will
 *     define the trust levels.
 */
    if ((kcr_type = (use & KCR_TRUST_MASK)) != KCR_UNTRUSTED) {
        /* Inherit the trust of the parent key. */
        if (kek_cc)
            kcr_type = kcr_get_trust(ccattr);
        else
            /* Dangling keys are untrusted */
            kcr_type = KCR_UNTRUSTED;
    }

/*
     *    The GEN_KEY operation can generate any type of key but a
     *    LSV, GKEK, or RKEK.  If it tries fail it.  In fact we
     *    could allow it to generate the GKEK if the application
     *    supplied a crypto_cntxt to the LSV, in fact it would work
     *    but lets now enforce the key generation routes from the
     *    right key.
     *
     *    The LSV check is really redundant because of the code
     *    below this checks if some fool is trying to create an
     *    LSV.  But it doesn't cost anything so we might as well
     *    do it here, makes things consisted, readability wise.
     */
    if( use & (KCR_LSV|KCR_GKEK|KCR_RKEK) )
         return CGX_INVALID_KEY_GEN_S;

break;

default:
    kcr_type = KCR_UNTRUSTED;

/*
     *    The DEFAULT operations can generate any type of key but a
     *    LSV, GKEK, or RKEK.  If it tries fail it.
     *
     *    The LSV check is really redundant because of the code
     *    below this checks if some fool is trying to create an
     *    LSV.  But it doesn't cost anything so we might as well
     *    do it here, makes things consisted, readability wise.
     */
        if( use & (KCR_LSV|KCR_GKEK|KCR_RKEK) )
         return CGX_INVALID_KEY_GEN_S;

break;
}

/* Validate kcr type passed in use. The application must
 * specify something! Futher, only single bits (currently,
 * only RKEK, GKEK, KEK, KKEK, HMAC or K) can be requested.
 */
kcrtmp = use & KCR_KTYPE_MASK;
if (kcrtmp & (KCR_HMAC|KCR_K|KCR_KKEK|KCR_RKEK|KCR_KEK|KCR_GKEK))
```

SOURCE CODE LISTING                                           Pg. 7

```
        kcr_type |= kcrtmp;
    else
        return CGX_KEK_REQUIRED_S;

/* if user requests a CGX_HMAC_A type of secret key we must force */
    /* the key type kcr attribute to KCR_HMAC, don't allow it to be */
    /* defined as a KEK, GKEK, RKEK or K.  Also, if via the GEN_KEK cmd */
    /* don't mess with type because it should of come in right if it came */
    /* from the GEN_KEK cmd, otherwise app is trying to spoof. */
    if( (knlCommand != CGX_GEN_KEK) && (knlCommand != CGX_GEN_RKEK) && (k_type
== CGX_HMAC_A) ) {
        kcr_type = ((kcr_type & ~KCR_KTYPE_MASK) | KCR_HMAC);
    }

/* Note parent's trust attribute in the attribute bits */
    if (kek_cc)
    {
        if (kcr_is_untrusted(ccattr))
            kcr_type |= KCR_PARENT_UNTRUSTED;
    }
    else if ((knlCommand != CGX_GEN_KEK) && (knlCommand != CGX_GEN_RKEK))
            /* No parent KEK, use untrusted */
        kcr_type |= KCR_PARENT_UNTRUSTED;

/* Check if valid type of key requested */
    if ((rc = kcr_validate(kcr_type, k_type, &length)) != CGX_SUCCESS_S)
        return rc;

/* If passed secret key object is NULL, generate a key for client */
    if (sk == (secretkey *)NULL)
    {
        /* Initialize the scratch key to all zero's */
        secretkey_init(&local_k);

/* Create actual user key into a local scratch key */
        if (rc = secretkey_gen_key(&local_k, k_type, length))
            return rc; /* Oops, something failed, bail */ sk = &local_k; /* Establish a pointer to it */
    }

/* Get copy of secretkey (sk) in kcr's seckey */
    kcr_seckey = kcr_get_seckey(r, (seckey *)&kcr_sk);
    seckey_secretkey2seckey(kcr_seckey, sk);
    seckey_set_length(kcr_seckey, length);
    seckey_set_type(kcr_seckey, k_type);

/* mark the KCR to contain a newly generated user key */
    kcr_set_key_attr(r, kcr_type);

/* Now transform the key into internal representation */
    seckey_setup(kcr_seckey, TRUE);

/* place the secret key into the kcr_index referred to as r */
    kcr_put_seckey(r, (seckey *)&kcr_sk);

/* If requested (i.e., bk has a value, cover the key using the
```

SOURCE CODE LISTING

Pg. 8

```
     * specified kek).
     */ if (bk) {
        rc = _cgxovlay_cover_key(r, bk_dp, bk, kek_cc, rkekFlag);
        if (rc != CGX_SUCCESS_S) {
            kcr_destroy(r);
            return rc;
        }
    }

/* Ask the crypto-block to remove its installed key if dest_kcr is KG */
    seckey_remove_loaded(r);

if (kcrtmp == KCR_KKEK) {
        seckey_load_kek(kcr_seckey);
    } return rc;
else
    return CGX_FAIL_S;
#endif
}
/*
 *  This operation returns a seckey object if the key is fit to be
 *  used in traffic encryption. This will fail if a LSV, GKEK, RKEK or
 *  a longer key than export allows is used. Will also fail if an
 *  empty KCR or invalid KCR is specified.
 *
 *  It reads back the actual secretkey red bits into the arg, sk,
 *  because the caller can't simply refer to the ptr verion of the
 *  secretkey. This is because the actual secret key could be sitting
 *  in an entirely different data RAM page.
 */
seckey *
_cgxovlay_valid_crypto_key(UINT16 kcr_key, seckey *sk)
{
    /* get the KCR secret key */
    if( kcr_check(kcr_key, (KCR_HMAC_T|KCR_ANY_KEK_T|KCR_VALID_T|KCR_EMPTY_T))
)
        return (seckey *)NULL; /* bad KCR key to use for crypto operations
*/ return kcr_get_seckey(kcr_key, sk);
}

/*
 *  This is the low level operation to call to perform the
 *  crypto operation decrypt or encrypt for the commands:
 *  CGX_HASH_ENCRYPT, CGX_HASH_DECRYPT, CGX_ENCRYPT, and
 *  CGX_DECRYPT ONLY. Do not use these commands for any other
 *  operation or you will be shot on the spot. This operation
 *  assumes the key already or to be loaded will be a data key.
 *  direction: 0 decrypt
 *             non0 encrypt
 */
UINT16
```

SOURCE CODE LISTING                                                          Pg. 9

```c
_cgxovlay_crypto(crypto_cntxt *cc, DPAGE dest_dp, UINT16 *dest_p, DPAGE src_dp,
UINT16 *src_p, UINT16 byte_cnt, UINT16 direction, UINT16 pad)
{
        UINT16          kcr_key;   /* KCR id of key loaded or to load */
        seckey          sk;   /* seckey object */

/* obtain the kcr location of the secret key to be used */
        kcr_key = _cgxovlay_kcr(cc);

/* check if a valid KCR key can be used for crypto like operations */
        if( _cgxovlay_valid_crypto_key(kcr_key, (seckey *)&sk) == (seckey *)NULL )
                return CGX_INVALID_REG_S; /* no such KCR key found */

/* encrypt or decrypt the data */
        seckey_encrypt_decrypt((seckey *)&sk, cc, direction, dest_dp,
                        (UINT16 *)dest_p, src_dp, (UINT16 *)src_p,
                        (UINT16)byte_cnt, pad);

return CGX_SUCCESS_S;
}

/*
 *      Based on a black secretkey and the cc or kek, uncover the black
 *      secretkey only if the kek is not trusted.  If all goes well
 *      pass a pointer to the seckey object in the scratch KCR location.
 */
seckey *
_cgxovlay_scratch_key(DPAGE bk_dp, secretkey *bk, DPAGE kek_dp, crypto_cntxt
*kek_cc, seckey *sk)
{
        crypto_cntxt    cc;
        UINT16          *dptr = (UINT16 *)&cc;
        UINT16          *kek_ccp = (UINT16 *)kek_cc;

/* First get a copy of the black key's cc to check the kek */
        mem_cpyDS(&knlDataPage, (MEMCPY_TYPE)&dptr, &kek_dp,
(MEMCPY_TYPE)&kek_ccp,
                sizeof(crypto_cntxt));

/* ensure valid KCR number */
        if(kcr_check(crypto_cntxt_kcr(&cc), KCR_VALID_T|KCR_EMPTY_T))
                return (seckey *)NULL;

/* check the black key to move's kek to see if it is a trusted */
        /* kek.  If it is trusted the black can not be moved, you can  */
        /* only move a key from a untrusted branch to any branch       */ if( kcr_is_trusted(kcr_get_attr(crypto_cntxt_kcr(&cc))) )
                return (seckey *)NULL;

/* First uncover the black secret key using the application supplied */
        /* black secretkey(a1) and kek(a2) */
        /* place the uncovered key into the scratch KCR location */
        if( _cgxovlay_uncover_key(KCR_SCRATCH_N, bk_dp, (secretkey *)bk,
                        kek_dp, (crypto_cntxt *)kek_cc) != CGX_SUCCESS_S )
                return (seckey *)NULL;
```

SOURCE CODE LISTING                                    Pg. 10

```c
        /* Next get a pointer to the red internal secret key, the */
        /* application's uncovered black secretkey. */
        return kcr_get_seckey(KCR_SCRATCH_N, sk);
}

/*
 *      This operation returns the KCR number based on the config bits
 *      of the crypto_cntxt.
 */
UINT16
_cgxovlay_kcr(crypto_cntxt *cc)
{
        /* check the type of config mode, if NOLOAD refer to the key */
        /* already loaded into the crypto-block */
        if( crypto_cntxt_crypto(cc) & CGX_NOLOAD_C )
                return seckey_key_id_loaded(CGX_DES_A);
        else
                return crypto_cntxt_kcr(cc);
}

/*
 *      general operation that cleans the scratch register out and returns
 *      the code passed in.
 */
UINT16
_cgxovlay_cleanup(UINT16 rc)
{
        /* clean up the scratch KCR so no one can use the result */
        kcr_destroy(KCR_SCRATCH_N); /* get rid of temporary KCR */ return rc;
}

/* CGX Overlay Operations */
/*
 *      The CGX overlay arguments have access to the two kernel block
 *      pointers to access the command and status blocks.  To access the
 *      command block a pointer knlCmdBlock is provided and setup by the
 *      secure Kernel.  To access the status block the pointer knlStatusBlock
 *      is provided and setup by the secure Kernel. Furthermore, several
 *      macros are provided to get at the arguments to the command block. In
 *      fact at this time there is a maximum of 10 arguments.  Therefore, there
 *      is 10 of these macros to access each argument:
 *                  argument_1 ... argument_10
 *
 *      The CGX overlay operations can use them or access the cmdblock arguments
 *      directly via knlCmdBlock.  The macros are defined in kernel.h.
 */

/*
 * CGX_INIT
 *
 */
UINT16
cgxovlay_init(void)
{
        return _cgxovlay_init();
```

SOURCE CODE LISTING                                Pg. 11

```
}

/*
 * CGX_DEFAULT
 *
 */
UINT16
cgxovlay_default(void)
{
      return _cgxovlay_default();
}

/*
 * CGX_RANDOM
 *
 */
UINT16
cgxovlay_random(void)
{
      random_dp(dpage_2, (UINT16 *)argument_2, (UINT16)argument_1);

return CGX_SUCCESS_S;
}

/*
 * CGX_GET_CHIPINFO
 *
 */
UINT16
cgxovlay_get_chipinfo(void)
{
      return _cgxovlay_get_chipinfo();
}

/* Encryption Commands */
/*
 * CGX_COVER_KEY
 *
 * Description: Cover srckcr using the crypto_cntxt and store
 * the result in the user's blkkey.
 */
/*
*IMPORTANT NOTE IMPORTANT NOTE IMPORTANT NOTE IMPORTANT NOTE IMPORTANT NOTE
*IMPORTANT NOTE IMPORTANT NOTE IMPORTANT NOTE IMPORTANT NOTE IMPORTANT NOTE
*IMPORTANT NOTE IMPORTANT NOTE IMPORTANT NOTE IMPORTANT NOTE IMPORTANT NOTE
*IMPORTANT NOTE IMPORTANT NOTE IMPORTANT NOTE IMPORTANT NOTE IMPORTANT NOTE
*     All keys when they are created or loaded must be brought into the
*     kernel via this operation, and this operation only.  This operation
*     performs the necessary checks to validate the proper kernel key
*     heirarchy.  Bypassing this operation could allow the kernel key
*     heirarchy to be violated.
*
*     Furthermore, the operation _cgxovlay_cover_key must be the only
*     operation used to cover a RED key and return it to the application,
*     for the same reasons just explained.
*
*     Moreover the operation, _cgxovlay_uncover_key, must be the only
```

SOURCE CODE LISTING                                            Pg. 12

```c
 *      operation used to uncover a BLACK secret key from the application
 *      into a RED one.
 *
 *      These rules must be enforced else the kernel key management scheme
 *      will go down the hopper.  Before making changes to the flow of keys
 *      please consult with one of these operations.
 */
UINT16
_cgxovlay_cover_key(kcr srckcr, DPAGE dbk_dp, secretkey *dest_bk, crypto_cntxt
*kek_cc, BOOL rkekFlag)
{
    UINT16        rc;           /* General return code              */
    UINT16        cntxt_type;   /* Type of the crypto context kcr   */
    UINT16        src_type;     /* Type of the kcr to be covered    */
    UINT16        attr;         /* Attribute field of srckcr        */
    secretkey     bk;           /* Local copy of blkkey             */
    crypto_cntxt  cc;           /* Local copy of crypto context     */
    kcr           cckcr;        /* Crypto context's kcr             */
    seckey        sseckey;      /* Local copy of source seckey      */
    UINT16        *sptr;

/* get the type of the key and the kek */
    src_type = kcr_get_key_type(kcr_get_attr(srckcr));

/* If a kek_cc was provided (i.e., non-NULL), fine we'll use it
     * below. If the kek_cc was NULL, then we had better be covering
     * a GKEK or an RKEK. If this is so, set up a local crypto context (to
     * reference the LSV) and proceed.
     */

/* if NULL */
    if (!kek_cc)
    {
        if ( src_type & (KCR_GKEK|KCR_RKEK) )
        {
            /* Called with NULL and the type is a GKEK or an RKEK, therefore the
             * covering key is the LSV. Make it so...
             */ kek_cc = &cc;
            crypto_cntxt_set_kcr(kek_cc, 0);    /* setting the kek_cc->key equal
to KCR zero */
        }
        else
            return CGX_KEK_REQUIRED_S;
    } cckcr = crypto_cntxt_kcr(kek_cc);  /* Assign the Kek KCR index to cckcr */

/* Check to see that kcrs are valid and not empty... In the case of
     * the srckcr, make sure the app is not trying to cover the LSV. Also,
     * don't allow the crypto context kcr be the same as the source.
     */ if (srckcr == cckcr)
        return CGX_KCR_SAME_S;
```

SOURCE CODE LISTING                                                    Pg. 13

```
    if (rc = kcr_check(srckcr, KCR_VALID_T | KCR_EMPTY_T | KCR_LSV_T))
        return rc;

if (rc = kcr_check(cckcr, KCR_VALID_T | KCR_EMPTY_T))
        return rc;

cntxt_type = kcr_get_key_type(kcr_get_attr(cckcr));
        /* next. Check the rkekFlag to see if we are saving a key under an rkek
(TRUE) or
         * not (FALSE)
         */ if(   !rkekFlag && (src_type == KCR_RKEK) )
             return CGX_INVALID_REG_S;

/* Check for correct combinations of crypto_cntxt and RED kcr types. */ switch (cntxt_type)
    {
    case KCR_LSV:
            /* The only thing that can be covered under the LSV is a GKEK or
an RKEK. */
        if (src_type < KCR_GKEK)
            return CGX_INVALID_REG_S;
        break;

case KCR_RKEK:
              /* Cannot use an RKEK to cover an LSV */
              if (src_type > KCR_GKEK)
                 return CGX_INVALID_REG_S;

/* if we are covering a key with an rkek then we better have
                   * come in from cgx_save_key. Else fail */
                  if(knlCommand != CGX_SAVE_KEY)
                      return CGX_INVALID_REG_S;

break;

case KCR_GKEK:
    case KCR_KEK:
        /*
         * We must be covering something at level 3 (or below in the
         * case of KEK) in the key hierarchy (i.e. KEK, K, or HMAC).
         * Src_type can't be KCR_EMPTY - this was checked above...
         */
        if (src_type > KCR_KEK)
            return CGX_INVALID_REG_S;
        break;

case KCR_KKEK:
        /* When covering with KKEK, assure that only data keys can
         * be covered by KKEK.
         */
```

SOURCE CODE LISTING                                                Pg. 14

```
    if (src_type != KCR_K)
        return CGX_INVALID_REG_S;
    break;

/*
 * If it wasn't a KEK of some type then fail, you can obly cover keys
 * with a KEK.
 */
default:
    return CGX_INVALID_REG_S;
}/* end switch */

/* For the LSV and GKEKs, setup the IV since we'll need to use
 * the fixed IV.
 */ if (cntxt_type >= KCR_GKEK) {
    crypto_cntxt_fix_iv(kek_cc);
} else {
    /*
     * Always force CBC mode regardless of CC KCR type.  Always force
     * KEK to be reloaded, pay a little more IO penalty for it.
     */
    crypto_cntxt_set_crypto(kek_cc, CGX_CBC_M|CGX_FORCELOAD_C);
} kcr_get_seckey(srckcr, (seckey *)&sseckey);
attr    = kcr_get_attr(srckcr);

/*
 * No longer required because the secret key is left in the internal
 * form at all times except when it is exported.  This is to allow the
 * application to load DES keys directly into the external HW crypto
 * block in the black form.  If we left it in external form HW would
 * have to key weaken it.
 *
seckey_unsetup(&sseckey);
 *
 */

/* Copy key and it's attributes (length, extra and type) */
seckey_2secretkey(&sseckey, &bk);

/*
     * Encrypt the key's length for later sanity check.
     */
    sptr = (UINT16 *)secretkey_key(&bk);
    sptr[CGX_SECRET_KEY_KLEN] = secretkey_length(&bk);

if ((rc = kcr_add_salt(secretkey_key(&bk), &attr)) == CGX_SUCCESS_S) {
    /* Encrypt uses 64-bit blocks, so we want to encrypt 7
     * 64-bit blocks (4 for the key + 3 for the hash).  The
     * interface requires a byte count, so multiply by 8.
     */ seckey_encrypt(kcr_get_seckey(cckcr, (seckey *)&sseckey), kek_cc,
            knlDataPage, (UINT16 *)secretkey_key(&bk),
```

SOURCE CODE LISTING                                              Pg. 15

```
              knlDataPage, (UINT16 *)secretkey_key(&bk),
        CGX_RAW_SECRET_KEY_HASH_BYTE_LENGTH, CGX_ZERO_PAD);

/* copy the black key back out to the application */
    sptr = (UINT16 *)&bk;
    mem_cpyDS(&dbk_dp, (MEMCPY_TYPE)&dest_bk, &knlDataPage,
(MEMCPY_TYPE)&sptr, sizeof(secretkey));
    }

/* Clean up */
#ifndef ADI2181
    memsett(&bk, 0, sizeof(secretkey)); /* OK */
#endif
    seckey_remove_loaded(cckcr);

return rc;
}

/*
*IMPORTANT NOTE IMPORTANT NOTE IMPORTANT NOTE IMPORTANT NOTE IMPORTANT NOTE
*IMPORTANT NOTE IMPORTANT NOTE IMPORTANT NOTE IMPORTANT NOTE IMPORTANT NOTE
*IMPORTANT NOTE IMPORTANT NOTE IMPORTANT NOTE IMPORTANT NOTE IMPORTANT NOTE  .
*IMPORTANT NOTE IMPORTANT NOTE IMPORTANT NOTE IMPORTANT NOTE IMPORTANT NOTE
*    All keys when they are created or loaded must be brought into the
*    kernel via this operation, and this operation only.  This operation
*    performs the necessary checks to validate the proper kernel key
*    heirarchy.  Bypassing this operation could allow the kernel key
*    heirarchy to be violated.
*
*    Furthermore, the operation _cgxovlay_cover_key must be the only
*    operation used to cover a RED key and return it to the application,
*    for the same reasons just explained.
*
*    Moreover the operation, _cgxovlay_uncover_key, must be the only
*    operation used to uncover a BLACK secret key from the application
*    into a RED one.
*
*    These rules must be enforced else the kernel key management scheme
*    will go down the hopper.  Before making changes to the flow of keys
*    please consult with one of these operations.
*/
UINT16
_cgxovlay_uncover_key(kcr destkcr, DPAGE bk_dp, secretkey *black, DPAGE kek_dp,
crypto_cntxt *kek_cc)
{
    UINT16       cntxt_type;   /* Type of the crypto context kcr    */
    UINT16       ktype;        /* Type of the uncovered key         */
    UINT16       k_type;       /* Key type of the uncovered key     */
    UINT16       rc;           /* General purpose return value      */
    UINT16       attr;         /* Key's attribute value             */
    UINT16       ccattr;       /* CC Key's attribute value          */
    secretkey    bk;           /* Local copy of blkkey              */
    crypto_cntxt cc;           /* Local copy of crypto context      */
    kcr          cckcr;        /* Crypto context kcr                */
    seckey       dseckey;      /* memory for a seckey               */
    UINT16       *dptr;
    UINT16       *sptr;
```

SOURCE CODE LISTING                                Pg. 16

```
    /* Copy user-specified data to working copies */
    if (!kek_cc)
        return CGX_KEK_REQUIRED_S;

/* mem copy in the kek_cc from somewhere in memory to the kernel memory and
name it &cc */
    sptr = (UINT16 *)kek_cc;
    dptr = (UINT16 *)&cc;
    mem_cpyDS(&knlDataPage, (MEMCPY_TYPE)&dptr, &kek_dp, (MEMCPY_TYPE)&sptr,
sizeof(crypto_cntxt));

/* mem copy in black from somewhere in memory to the kernel memory and name
it &bk */
    sptr = (UINT16 *)black;
    dptr = (UINT16 *)&bk;
    mem_cpyDS(&knlDataPage, (MEMCPY_TYPE)&dptr, &bk_dp, (MEMCPY_TYPE)&sptr,
sizeof(secretkey));

/* set cckcr to contain the KEK's KCR location */
    cckcr = crypto_cntxt_kcr(&cc);

/* Verify that kcrs are valid and that the destination location is
     * not the LSV (can't overwrite LSV). In addition, make sure that the
     * crypto context is not empty (but can be LSV for GKEK or RKEK).
     */ if (rc = kcr_check(destkcr, KCR_VALID_T | KCR_LSV_T))
        return rc;

if (rc = kcr_check(cckcr, KCR_VALID_T | KCR_EMPTY_T))
        return rc;

/* get the attributes of the KEK located in the KCR */
    ccattr = kcr_get_attr(cckcr);
    cntxt_type = kcr_get_key_type(ccattr); /* the kek type */

/* Always force CBC mode, regardless of CC KCR type */
    crypto_cntxt_set_crypto(&cc, CGX_CBC_M|CGX_FORCELOAD_C);

/*
     * if (dest_type != KCR_EMPTY && knlLoginId < CGX_OPERATOR_L)
     *    return CGX_PRIVILEGE_DENIED_S;     // Insufficient privilege
     */

/* Assume that the crypto_cntxt contains a valid kcr. This must
     * be so, since we wouldn't allow the kcr to be populated if the
     * combination of parameters wasn't valid.
     */

/* KEK type */
    switch(cntxt_type) {
    case KCR_LSV:
            /* Type can be an RKEK or a GKEK */
            /* The bk is either a GKEK or an RKEK and must be a tdes */
            if (secretkey_type(&bk) != CGX_TRIPLE_DES_A)
```

SOURCE CODE LISTING

```
                return CGX_BAD_MODE_S;
            else
                ktype = KCR_GKEK | KCR_RKEK;
            /* fix the IV */
            crypto_cntxt_fix_iv(&cc);

break;

case KCR_RKEK:

/* We do not support key restore under an RKEK. Therefore, if the
KEK is the RKEK, then FAIL !!! */ return CGX_RKEK_UNCOVER_FAIL_S;
            break;
    case KCR_GKEK:
            /* Type can be KEK, KKEK, or K, otherwise, validate would have
             * failed. ktype will be checked after the key has been
             * uncovered....
             */ ktype = KCR_KEK | KCR_KKEK | KCR_K;

/* fix the IV */
            crypto_cntxt_fix_iv(&cc);

break;

case KCR_KEK:
            /* Type must be KEK, KKEK or K otherwise validate would have
             * failed. Use the user-provided IV - must be uncovering with
             * a level 3 (or lower, level 4, level 5 ...) key.
             */
            ktype = KCR_KEK | KCR_KKEK| KCR_K;
            break;

case KCR_KKEK:
            /* Only valid type allowed to be stored under a KKEK is a K */
            ktype = KCR_K;
            break;

default:
            /* Crypto context must contain a KEK! */
            return CGX_KEK_REQUIRED_S;
    }

/* if key is an HMAC key then add that to the type */
    /* or the kcr_validate check will fail, will be validated */
    /* again below */

/* looking at the algorithm */
      /* if a CGX_HMAC_A (algorithm) */
    if( (k_type = secretkey_type(&bk)) == CGX_HMAC_A )
            ktype |= KCR_HMAC;      /* set the KCR type */

/* Validate the contents of the kcr for the black key */
```

Pg. 17

SOURCE CODE LISTING     Pg. 18

```
                            /* KCR type, algorithm type, length of
key            */
    if (rc = kcr_validate(ktype, secretkey_type(&bk), &secretkey_length(&bk)))
        return rc;

/* Interface to the decrypt uses 64-bit blocks, so encrypt 7 64-bit
     * blocks (4 for the key + 3 for the hash value).
     */

/* decrypt the black key with the KEK */
    /* first kcr_get_seckey() gets the actual KEK secret key material and
assign it to &dseckey */
    seckey_decrypt(kcr_get_seckey(crypto_cntxt_kcr(&cc), (seckey *)&dseckey),
&cc,
            knlDataPage, (UINT16 *)secretkey_key(&bk),
            knlDataPage, (UINT16 *)secretkey_key(&bk),
            CGX_RAW_SECRET_KEY_HASH_BYTE_LENGTH, CGX_ZERO_PAD);

/* Remove the salt and obtain the attribute bits of the red key */
    if ((rc = kcr_remove_salt(secretkey_key(&bk), &attr)) == CGX_SUCCESS_S) {
        /* Initialize seckey we'll populate it with the key recreated
         * above and with the type, extra and length fields that were
         * part of the original key.
         */
        /* dseckey = kcr_get_seckey(destkcr, (seckey *)&dseckey); */
        seckey_secretkey2seckey(&dseckey, &bk);         /* mem copies SRC red
key to dseckey */
        seckey_set_type(&dseckey, k_type);              /* sets the A type
*/
        seckey_setup(&dseckey, FALSE);                  /* weakens key if
TRUE */
        kcr_put_seckey(destkcr, (seckey *)&dseckey);    /* put into destkcr */

/* Now based on the real key attributes we need to re-check */
        /* using kcr_validate. This is done here to validate for */
        /* HMAC keys, but will work for the general keys as well. */
        /* Also, the length is ignored, already adjusted in the */
        /* first call to kcr_validate */
        if (rc = kcr_validate(attr, k_type, &secretkey_length(&bk)))
            return rc;

/* check the attributes against the ktype. If something isn't set,
then fail */
        if ( !(ktype & attr) )
            return CGX_BAD_KEY_ATTRIBUTES_S;

/*
         *    Confirm the length of key is valid, must match the one
         *    stored outside of encrypted material.
         */
        sptr = (UINT16 *)secretkey_key(&bk);
        if( sptr[CGX_SECRET_KEY_KLEN] != secretkey_length(&bk) )
            return CGX_INVALID_LEN_S;

/* If ktype is not an rkek of a gkek then, bring in the existing trust
         * mask, else, set to trusted */
        if ( !(ktype & (KCR_GKEK | KCR_RKEK) ) )
```

SOURCE CODE LISTING

```
            attr &= (ktype | KCR_TRUST_MASK);
        else
            attr = (ktype & attr) | KCR_TRUSTED;

/* Note parent's trust attribute in the attribute */
            if (kcr_is_untrusted(ccattr))
                attr |= KCR_PARENT_UNTRUSTED;

kcr_set_key_attr(destkcr, attr);

/* install the HW KKEK if a KKEK is uncovered */
        if (attr & KCR_KKEK) {
            seckey_load_kek(&dseckey);
        }
    }

/* Clean up */
#ifndef ADI2181
    memsett(&cc, 0, sizeof(crypto_cntxt)); /* OK */
    memsett(&bk, 0, sizeof(secretkey));    /* OK */
#endif
    seckey_remove_loaded(destkcr);

return rc;
}

/*
 * CGX_UNCOVER_KEY
 *
 * Description: Uncover a black key (argument_2) using the crypto_cntxt
 *              (argument_3) and store the result in the destination kcr
 *              (argument_1).
 */
UINT16
cgxovlay_uncover_key(void)
{
    return _cgxovlay_uncover_key((kcr) argument_1, dpage_2, (secretkey
*)argument_2,
                    dpage_3, (crypto_cntxt *) argument_3);
}

/*
 * CGX_GEN_KEK
 *
 *   This operation is responsible for creating a RED GKEK and
 *   placing it in the user desired KCR. A GKEK is by requirements
 *   a triple length DES key.
 */
UINT16
cgxovlay_gen_kek(void)
{
    /* create the secret GKEK and store it in the desired KCR */
    return _cgxovlay_load_key((secretkey *)NULL, (kcr)argument_1,
                    KCR_GKEK, CGX_TRIPLE_DES_A, 21, dpage_2,
                    (secretkey *)argument_2, knlDataPage, (crypto_cntxt
*)NULL, FALSE);
}
```

Pg. 19

SOURCE CODE LISTING  Pg. 20

```c
/*
 * CGX_GEN_RKEK
 *
 *    This operation is responsible for creating a RKEK and
 *    placing it in the user desired KCR. A RKEK is by requirements
 *    a triple length TDES key. An rkek can only be generated once
 *    a token has been verified. The args are as follows:
 *
 *    argument_1:    token  The token
 *    argument_2:    kcr    The key cache reg. Passed in by value.
 *    argument_3:    dhpk   The local dh covered private key.
 *    argument_4:    dhkek  The local dh kek. Must not allow for null kek.
 *    argument_5:    rkek   The black rkek to be returned
 *
 */

UINT16
cgxovlay_gen_rkek(void)
{

UINT16          rc = CGX_SUCCESS_S;
    UINT16                  writeOverSn=TRUE;  /* This flag is used to cause
the token verify routine
                                                * to automatically
(blindly) write over the tokens s/n
                                                * with the chip's
s/n, providing that the flag is TRUE.
                                                */

UINT16          g_xlength;
    UINT16          *g_xdata;        /* create two variables to contain the
"remote" g^x
                                      * data and length from the token */

/* reset the heap */
    pubkey_reset_heap();

/* sanity check:
     * if the dhpk; generator/modulus/private_key or the rkek are NULL
     * then return CGX_FAILED_RKEK_S. The dhpk can NOT be allowed to be red.
     */ if ( argument_3==NULL || argument_4==NULL || argument_5==NULL)
        return CGX_FAILED_GEN_RKEK_S;

/* If the token_verify routine returns SUCCESS, then gen rkek. */

/*
     * If the token is ok, the g_xdata pointer will contain the g^y data from
the token.
     * The application passed in the generator, modulus and the covered
private x (to create g^xy).
```

SOURCE CODE LISTING

```
        * So call a custom function which will call bigpow and generate g^xy, the
rkek. Once the rkek
        * is generated call cgxovlay_load_key to load the rkek and return the
covered rkek to the application
        */ if( (rc=_cgxovlay_token_verify( dpage_1, (token_no_data *)argument_1,
                          writeOverSn, (UINT16 *)&g_xlength, (UINT16 **)&g_xdata )
)== CGX_SUCCESS_S)
        {
#if defined(SIM2181) || defined(VSIM2181)
            goto RkekDone;
#endif
            /* Token has been verified.  The token data contains the public
value: g^y.
             * next, call a function to call bigpow and complete the
exponentiation
             */ if ((_cgxovlay_complete_negkey((BigInt *)NULL, dpage_3, argument_3,
dpage_4, argument_4,
                          (UINT16)g_xlength, knlDataPage, g_xdata, KCR_RKEK,
CGX_TRIPLE_DES_A, CGX_MAX_SECRET_KEY_LENGTH_B,
                          dpage_5, (secretkey *)argument_5, knlDataPage,
(crypto_cntxt *)NULL,
                          (kcr )argument_2, (publickey *)NULL, TRUE )) !=
CGX_SUCCESS_S)
                rc = CGX_FAILED_RKEK_S;

}
        else rc = CGX_FAILED_TOKEN_VERIFY_S;

#if defined(SIM2181) || defined(VSIM2181)
RkekDone:
#endif
        /* ensure the heap is reset */
        pubkey_reset_heap();

return rc;
}

/*
** cgxovlay_save_key
*
*   FILENAME: d:\kerntest\src\CGXOVLY1.C
*
*   PARAMETERS:
*
*   DESCRIPTION:       uncover the black key with the kek, then cover the red
key with the rkek.
*                      Return the covered red key back to the application
*
*   Arg_1 is the secretkey *bk_uncover.     The key to be uncovered.  Cannot
be an LSV
```

SOURCE CODE LISTING                                                Pg. 22

```
 *     Arg_2 is the crypto_cntxt *bkek.        The kek required to uncover the
bk.
 *     Arg_3 is the secretkey *bk_returned.    The black key that will be saved
under the rkek and returned to the appl.
 *     Arg_4 is the crypto_cntxt *rkek.        The rkek used to cover the bk.
 *
 *   RETURNS:
 *
 */

UINT16
cgxovlay_save_key(void)
{ secretkey         sk;                    /* local sk */
        seckey            kcr_sk;

if ( (argument_1 == (secretkey *)NULL) || (argument_3 == (secretkey
*)NULL) || (argument_4 == (crypto_cntxt *)NULL) )
                return CGX_FAILED_SAVE_KEY_S;

/* 1st call the uncover operation, then call the load operation */

/* uncover the bk_uncovered and place the exposed key to the SCRATCH KCR
*/
        if( (_cgxovlay_uncover_key(KCR_SCRATCH_N, dpage_1, (secretkey
*)argument_1, dpage_2, (crypto_cntxt *)argument_2) )!=CGX_SUCCESS_S)
                return CGX_FAILED_SAVE_KEY_S;

/* Next, we must create a secretkey from the seckey that is in the scratch
KCR */
        /* and pass it in the load operation as the 1st argument sk */ seckey_2secretkey(kcr_get_seckey(KCR_SCRATCH_N, (seckey *)&kcr_sk), &sk);

/* The uncovered key resides in the scratch KCR */
        /* Next, cover the key under the RKEK by calling cgxovlay_load_key */ if( (_cgxovlay_load_key((secretkey *)&sk, KCR_SCRATCH_N,
kcr_get_attr(KCR_SCRATCH_N), secretkey_type(&sk), secretkey_length(&sk),
                        dpage_3, (secretkey *)argument_3, dpage_4, (crypto_cntxt
*)argument_4, FALSE) ) !=CGX_SUCCESS_S)
                return CGX_FAILED_SAVE_KEY_S;

kcr_destroy(KCR_SCRATCH_N);

return CGX_SUCCESS_S;

}
```

What is claimed is:

1. A method of managing encryption keys in a cryptographic co-processor, which comprises the steps of:

selecting a key type from one of a symmetrical key type and an asymmetrical key type, wherein a user selects the key type;

selecting a bit length;

generating a key, the generated key having the selected key type and the selected bit length, the step of generating a key being performed in at least one way selected from a group of ways consisting of: 1) sampling an output of a random number generator to assemble a desired length data encryption key (DEK); 2) sampling an output of a random number generator to assemble a desired length key encryption key (KEK); 3) performing a Diffie-Hellman $g^{xy}$ exponentiation in order to arrive at a shared secret value; 4) deriving a symmetrical secret key by hashing an application supplied password or passphrase; 5) transforming a key using at least one of hashing, mixing with fixed data and rehashing, and exclusive oring (XORing); and 6) importing an unencrypted (RED) key provided by the application; and representing the generated key in one of an external form and an internal form, the method of managing encryption keys supporting an internally generated storage variable, a local storage variable and a user application generated KEK.

* * * * *